US011288758B2

(12) United States Patent
Pierce et al.

(10) Patent No.: US 11,288,758 B2
(45) Date of Patent: *Mar. 29, 2022

(54) DATA PAYMENT AND AUTHENTICATION VIA A SHARED DATA STRUCTURE

(71) Applicant: Chicago Mercantile Exchange Inc., Chicago, IL (US)

(72) Inventors: Ryan Pierce, Chicago, IL (US); Elizabeth Freeman, Chicago, IL (US); Angela Wozniak, Villa Park, IL (US); Mansoor Ahmed, Naperville, IL (US)

(73) Assignee: CHICAGO MERCANTILE EXCHANGE INC., Chicago, IL (US)

( * ) Notice: Subject to any disclaimer, the term of this patent is extended or adjusted under 35 U.S.C. 154(b) by 311 days.

This patent is subject to a terminal disclaimer.

(21) Appl. No.: 16/749,660

(22) Filed: Jan. 22, 2020

(65) Prior Publication Data

US 2020/0160467 A1 May 21, 2020

Related U.S. Application Data

(63) Continuation of application No. 15/174,548, filed on Jun. 6, 2016, now Pat. No. 10,580,100.

(51) Int. Cl.
*G06Q 50/18* (2012.01)
*H04L 65/613* (2022.01)
(Continued)

(52) U.S. Cl.
CPC ....... *G06Q 50/184* (2013.01); *H04L 63/0435* (2013.01); *H04L 63/08* (2013.01);
(Continued)

(58) Field of Classification Search
CPC ............. G06Q 50/184; G06Q 2220/00; G06Q 2220/18; H04L 63/0435; H04L 63/08;
(Continued)

(56) References Cited

U.S. PATENT DOCUMENTS 7,636,703 B2   12/2009   Taylor
7,840,482 B2   11/2010   Singla et al.
(Continued)

FOREIGN PATENT DOCUMENTS

WO   2008/154306   12/2008
WO   2011/134975   11/2011
WO   2012/079041    6/2012

OTHER PUBLICATIONS

"Central Processing Unit", Wikipedia, Feb. 27, 2009, https://en.wikipedia.org/wiki/Central_processing_unit.
(Continued)

*Primary Examiner* — James D Nigh
(74) *Attorney, Agent, or Firm* — Lempia Summerfield Katz LLC

(57) ABSTRACT

The disclosed embodiments relate generally to complex data stream control and entitlement. Specifically, the disclosed embodiments provide systems and methods for ensuring that only authenticated/verified participants receive data streams. A third party, e.g., a party other than the data provider or the data recipient, who is nevertheless associated with both the data provider and the data recipient, may be involved in controlling whether data streams from the data provider can reach the data recipient. Thus, a third party may logically sit between the data provider and the data recipient, and may decide whether the data recipient should receive data streams. The disclosed embodiments implement data generation, flow, control and permissioning between multiple entities via digital assets accessed and manipulated on a shared data structure.

20 Claims, 10 Drawing Sheets

(51) Int. Cl.
  *H04L 67/53* (2022.01)
  *H04L 67/01* (2022.01)
  *H04L 69/40* (2022.01)
  *H04L 29/06* (2006.01)

(52) U.S. Cl.
  CPC .......... *H04L 63/10* (2013.01); *H04L 65/4092* (2013.01); *H04L 67/20* (2013.01); *H04L 67/42* (2013.01); *H04L 69/40* (2013.01); *G06Q 2220/00* (2013.01); *G06Q 2220/18* (2013.01); *H04L 2463/062* (2013.01); *H04L 2463/102* (2013.01)

(58) Field of Classification Search
  CPC ..... H04L 63/10; H04L 65/4092; H04L 67/20; H04L 67/42; H04L 2463/062; H04L 2463/102
  USPC ......................................................... 705/59
  See application file for complete search history.

(56) References Cited

U.S. PATENT DOCUMENTS

| | | |
|---|---|---|
| 7,921,046 B2 | 4/2011 | Parsons et al. |
| 7,954,114 B2 | 5/2011 | Chamberlain et al. |
| 8,069,102 B2 | 11/2011 | Indeck et al. |
| 8,407,122 B2 | 3/2013 | Parsons et al. |
| 8,458,081 B2 | 6/2013 | Parsons et al. |
| 8,548,900 B1 | 10/2013 | Glackin et al. |
| 2003/0105718 A1* | 6/2003 | Hurtado ............ G06Q 20/3821 705/51 |
| 2004/0186803 A1 | 9/2004 | Weber et al. |
| 2005/0149428 A1 | 7/2005 | Gooch et al. |
| 2006/0095360 A1 | 5/2006 | Apple et al. |
| 2006/0106707 A1 | 5/2006 | Shetty et al. |
| 2007/0118460 A1 | 5/2007 | Bauerschmidt et al. |
| 2008/0010183 A1 | 1/2008 | Holmes et al. |
| 2008/0126853 A1 | 5/2008 | Callaway et al. |
| 2009/0012892 A1 | 1/2009 | Biase |
| 2009/0171723 A1 | 7/2009 | Jenkins |
| 2009/0182683 A1 | 7/2009 | Taylor et al. |
| 2009/0287628 A1 | 11/2009 | Indeck et al. |
| 2010/0153254 A1 | 6/2010 | Shalen |
| 2010/0241758 A1 | 9/2010 | Oddie et al. |
| 2011/0047098 A1 | 2/2011 | Erlanger |
| 2011/0145447 A1 | 6/2011 | Dimond |
| 2011/0178911 A1 | 7/2011 | Parsons et al. |
| 2011/0178912 A1 | 7/2011 | Parsons et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179050 A1 | 7/2011 | Parsons et al. |
| 2011/0184844 A1 | 7/2011 | Parsons et al. |
| 2011/0246351 A1 | 10/2011 | Sulavka |
| 2011/0264578 A1 | 10/2011 | Chapman et al. |
| 2011/0320335 A1 | 12/2011 | Gorelik et al. |
| 2012/0047062 A1 | 2/2012 | Robinson |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0246052 A1 | 9/2012 | Taylor et al. |
| 2012/0259757 A1 | 10/2012 | Nager |
| 2012/0290460 A1 | 11/2012 | Curry, Jr. et al. |
| 2013/0030963 A1 | 1/2013 | Cramer et al. |
| 2013/0218739 A1* | 8/2013 | Kmiec .................. G06Q 40/04 705/37 |
| 2013/0226764 A1 | 8/2013 | Battyani |
| 2014/0143121 A1 | 5/2014 | Stevens |
| 2014/0279342 A1 | 9/2014 | Maynard |
| 2014/0289094 A1 | 9/2014 | Gaber et al. |
| 2015/0127512 A1 | 5/2015 | Studnitzer et al. |
| 2015/0127516 A1* | 5/2015 | Studnitzer .............. G06Q 40/04 705/37 |
| 2016/0292672 A1* | 10/2016 | Fay ........................ G06Q 20/36 |
| 2016/0292680 A1* | 10/2016 | Wilson, Jr ............. G06Q 20/40 |
| 2017/0228731 A1* | 8/2017 | Sheng .................. G06Q 20/401 |

OTHER PUBLICATIONS

"Data Transmission", Wikipedia, Feb. 1, 2009, http://web.archive.org/web/20090201120014/http://en.wikipedia.org/wiki/Data_transmission.
"Distributed Concurrence Ledgers", Whitepaper, Packet Dynamics LLC, Feb. 23, 2016, 7 pages.
"Ethereum", Wikipedia, Jun. 2, 2016, https://en.wikipedia.org/wiki/Ethereum.
"High Performance Trading—Deployment of Leading Edge Technology Thinking", Argon Design, 2013, 2 pages.
"Logic Components", Oklahoma State University, SAS Institute Inc., Jan. 8, 2007, http://web.archive.org/web/20070108163801/http://www.okstate.edu/sas/v8/sashtml/qsim/chap2/sect4.htm.
"Real-time Operating System", Wikipedia, Retrieved May 19, 2013, http://en.wikipedia.org/wiki/Real-time_operating_System, 6 pages.
"Solace Message Routers and Cisco Ethernet Switches: Unified Infrastructure for Financial Services Middleware", White Paper, 2010, 15 pages, Cisco Systems, Inc.
"What is a Real-Time Operating System (RTOS)?", National Instruments, Oct. 2, 2012, 2 pages.
Benjamin Geib, "Investigating Low Latency Trading with an HT Enabled FPGA", Universitat Heidelberg, Aug. 2, 2011, 17 pages.
C. Leber et al., "High Frequency Trading Acceleration Using FPGAs", International Conference on Field Programmable Logic and Applications, 2011, 317-322.
Cisco Systems, Inc., "Design Best Practices for Latency Optimization", 1992-2007, 8 pages.
Corvil, "Nanosecond Latency Management", Whitepaper, 2011, 10 pages.
Digitial Asset's proposed code contribution to the Linux Foundation's Hyperledger Project written in Java and Scala, Digital Asset, 5 pages, retrieved on Mar. 31, 2016, https://github.com/DigitalAssetCom/hlp-candidate.
Ethereum Project, Ethereum, 12 pages, downloaded Jun. 2, 2016, https://www.ethereum.org/.
Gendal, "Introducing R3 Corda™: A Distributed Ledger Designed for Financial Services", Apr. 5, 2016, https://gendal.me/2016/04/05/introducing-r3-corda-a-distributed-ledger-designed-for-financial-services/.
George Howard, "Imogen Heap Gets Specific About Mycelia: A Fair Trade Music Business Inspired by Blockchain", Forbes, Jul. 28, 2015, 12 pages.
George Howard, "Imogen Heap's Mycelia: An Artists' Approach for A Fair Trade Music Business, Inspired by Blockchain", Forbes, Jul. 17, 2015, 19 pages.
Hyperledger Project, 2 pages, retrieved Mar. 31, 2016, https://github.com/hyperledger/hyperledger.
International Search Report and Written Opinion, from PCT/US2014/064001, dated Feb. 13, 2015, WO.
International Search Report in International Patent Application No. PCT/AU2009/000849, dated Aug. 6, 2009, 4 pages.
International Search Report in International Patent Application No. PCT/EP2011/056611, dated Jan. 20, 2012, 3 pages.
Leber et al., "How to Get World's Best Possible Ultra Low Latency in High Frequency Trading (Tick to Trade Method)", 2012.
Lockwood, et al., "A Low-Latency Library in FPGA Hardware for High-Frequency Trading (HFT)", 2012 IEEE 20th Annual Symposium on High-Performance Interconnects, 2012, pp. 9-16.
low-latency.com, "Groundbreaking Results for High Performance Trading with FPGA and x86 Technologies", Newswire, Sep. 25, 2013, 2 pages.
McLean et al., "Demystifying Blockchain and Distributed Ledger Technology—Hype or Hero?", Morrison & Foerster, Apr. 5, 2016, 8 pages.
Open Blockchain Whitepaper, 10 pages, retrieved Mar. 31, 2016, https://github.com/openblockchain/obc-docs/blob/master/whitepaper.md.

(56) References Cited

OTHER PUBLICATIONS

Risca et al., "Trading Floor Architecture", Cisco Systems, 2008, 36 pages.
Robert Kowalski, "Algorithm=Logic+Control", Communications of the ACM, Jul. 1979, 13 pages, vol. 22, No. 7.
Scott Caudell, "Co-location, Performance Management and Technology Innovation for Ultra-low Latency Trading", High Performance Technologies for Trading, Apr. 2010, 5 pages, Issue 5.
The Periodic Table of Elements, The Elements Project, 1 page, retrieved Mar. 31, 2016, https://www.elementsproject.org/elements/.
The World's Fastest and Most Secure Payment System, Ripple, 4 pages, retrieved Mar. 31, 2016, https://github.com/ripple/rippled.
Tse et al., "High Frequency Trading—Measurement, Detection and Response", Trading Strategy, Dec. 6, 2012, 12 pages.
Tse et al., "High Frequency Trading—The Good, The Bad, and The Regulation", Trading Strategy, Dec. 5, 2012, 7 pages.
Wikipedia, "Real-time Business Intelligence", Retrieved May 19, 2013, 4 pages, http://en.wikipedia.org/wiki/Real-time_business_intelligence.

* cited by examiner

DATA PAYMENT AND AUTHENTICATION VIA A SHARED DATA STRUCTURE

PRIORITY CLAIM

This application claims priority to and the benefit as a continuation of U.S. patent application Ser. No. 15/174,548, filed Jun. 6, 2016, entitled, "Data Payment and Authentication via a Shared Data Structure", now U.S. Pat. No. 10,580,100, issued Mar. 3, 2020, the entirety of which is herein incorporated by reference and relied upon.

BACKGROUND

Data service providers typically generate and provide data to paying customers or subscribers, such as an on a regular, periodic, on-going or continuous basis, typically referred to as a data feed or stream. The data providers can typically easily control which customers receive which types of data when the customers interact in a bilateral fashion with the data providers. However, data is often subscribed to, provided and consumed in a non-linear, multilateral fashion. For example, a data set may be manipulated or modified more than once, by more than one different entity, and consumed more than once and in different forms. Complex data subscription licenses can be difficult to control, audit, and bill.

DETAILED DESCRIPTION

Figure 1A:
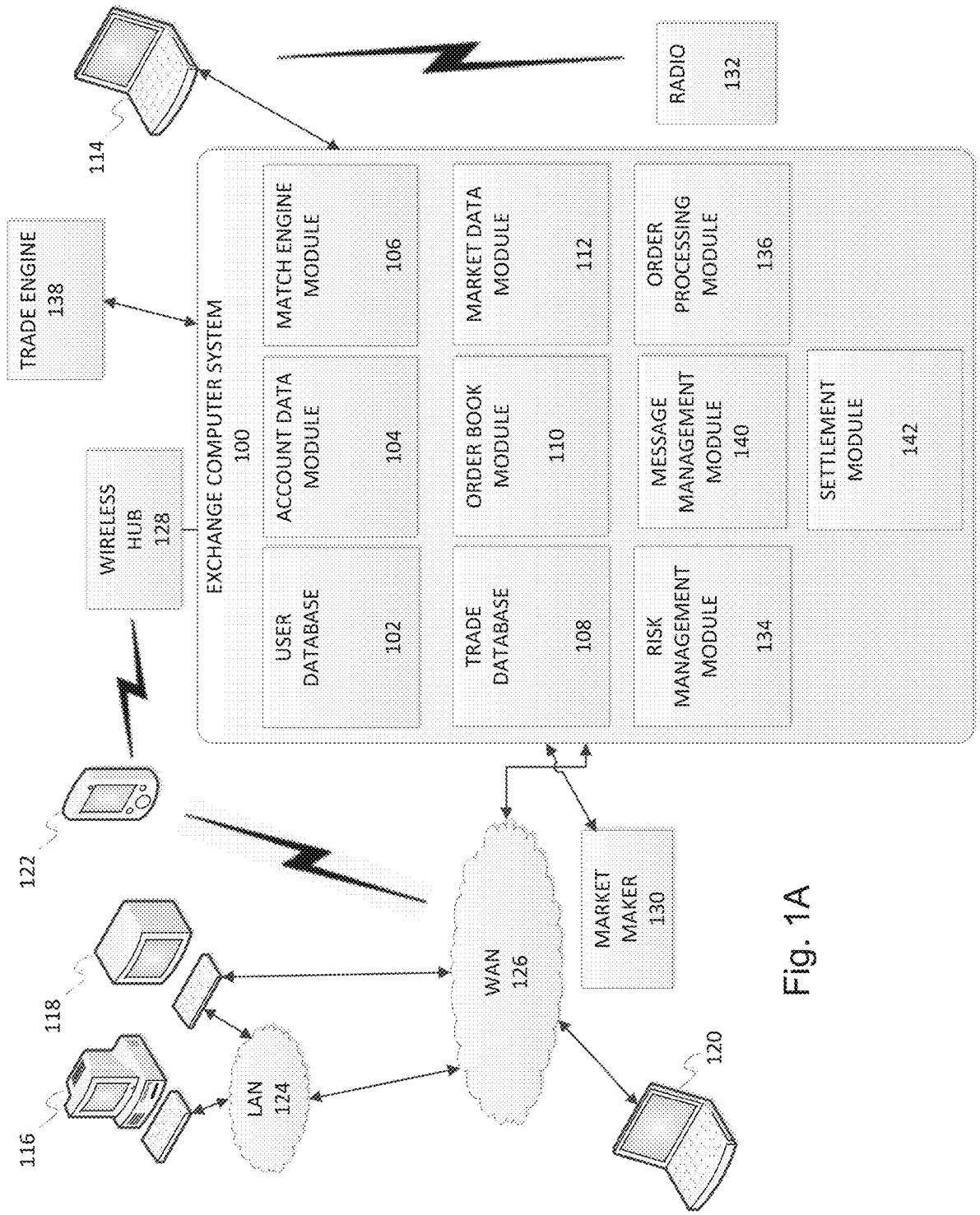
FIG. 1A depicts an illustrative computer network system that may be used to implement aspects of the disclosed embodiments.

The disclosed embodiments relate generally to data stream licensing, control and payment management. Specifically, the disclosed embodiments provide systems and methods for ensuring that only authenticated/verified participants receive or are otherwise able to access a data stream. A third party, e.g., a party other than the data provider or the data recipient, who is nevertheless associated with both the data provider and the data recipient, may be involved in controlling which data streams from the data provider are delivered to, or otherwise accessible by, the data recipient. Thus, a third party e.g., an intermediary party, may logically sit between the data provider and the data recipient, and may control whether the data recipient should receive or otherwise have access to the data stream. The intermediary party may also modify, repackage, and/or republish the data of the data stream. In particular, the disclosed data entitlement system provides data stream generation, flow, control and permissioning, as well as facilitates payment with respect thereto, between multiple entities via digital assets accessed and manipulated via a shared data structure such as a distributed electronic ledger.

The disclosed data entitlement system improves upon the technical field of data processing and messaging by generating a shared data structure that is distributed among multiple entities acting upon or in response to data. Thus, in one embodiment, the disclosed data entitlement system may improve the fault tolerance of a data messaging system by replicating data across different locations simultaneously, or substantially or approximately simultaneously, based on the permission and access level granted to each entity. In one embodiment, the system improves fault tolerance of a data exchange system by avoiding the requirement of a central authority that exclusively holds or controls a digital entitlement asset required to distribute market data, i.e., because the digital entitlement asset is replicated in multiple locations, as described herein.

The disclosed system also facilitates a shared control of data streams involving multiple parties acting on the data within the data streams. At least some of the problems solved by the disclosed data entitlement system are specifically rooted in technology, specifically in electronic data communications where multiple entities share, access and act upon data that is replicated across user systems. The result is the complexity and difficulty arising in computer systems of data generation, enhancement and consumption across a plurality of different computing systems.

The solutions disclosed herein are, in one embodiment, implemented as automatic responses and actions by computing systems which are in communication with each other via a shared data structure, e.g. a distributed electronic ledger.

For example, in one embodiment, a computer implemented method for generating a data entitlement asset for storage within a data structure shared among a plurality of participant computing systems is disclosed. The plurality of participant computing systems may include a data generator participant computing system, a plurality of data redistributor participant computing systems, and a plurality of data consumer participant computing systems. The shared data structure may be stored in a memory, and a portion of the shared data structure may be coupled with a processor. The computer implemented method may comprise receiving, by a processor associated with the data generator participant computing system, a plurality of electronic data transaction request messages, and modifying, by the processor, at least one data object stored in a memory based on at least one of the plurality of electronic data transaction request messages. The method may further comprise generating, by the processor based on the modifying, data indicating the modifications to the at least one data object and identifying, by the processor, and receiving a data entitlement request stored in the shared data structure by a participant computing system of the plurality of participant computing systems, the data entitlement request comprising a request for access to the data indicating the modification to the at least one data object. The method may further include determining, by the processor, whether the data entitlement request is valid. If the processor determines that the data entitlement request is valid, the processor may automatically generate a data entitlement asset and store the generated data entitlement asset in the shared data structure, the data entitlement asset being operative to enable access by the participant computing system to the requested data indicating the modifications to the at least one data object.

One exemplary environment where data streams, also referred to as data feeds, are provided and licensed is in financial markets, and in particular, electronic financial exchanges, such as a futures exchange, such as the Chicago Mercantile Exchange Inc. (CME).

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

While the disclosed embodiments may be discussed in relation to futures and/or options on futures trading, it should be appreciated that the disclosed embodiments may be applicable to any equity, fixed income security, currency, commodity, options or futures trading system or market now available or later developed.

An exemplary trading network environment for implementing trading systems and methods is shown in FIG. 1A. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described below.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A message management module 140 may be included to, among other things, receive, and extract orders from, electronic messages as is indicated with one or more aspects of the disclosed embodiments.

A settlement module 142 (or settlement processor or other payment processor) may be included to provide one or more functions related to settling or otherwise administering transactions cleared by the exchange. Settlement module 142 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 142 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 142 may be used to determine a mark to market amount on a daily basis during the term of the financial instrument. Such determinations may also be made on a settlement date for the financial instrument for the purposes of final settlement.

In some embodiments, the settlement module 142 may be integrated to any desired extent with one or more of the other modules or processors of the exchange computer system 100. For example, the settlement module 142 and the risk management module 134 may be integrated to any desired extent. In some cases, one or more margining procedures or other aspects of the margining mechanism(s) may be implemented by the settlement module 142.

It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the message management module 140, settlement module 142, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

Figure 1B:
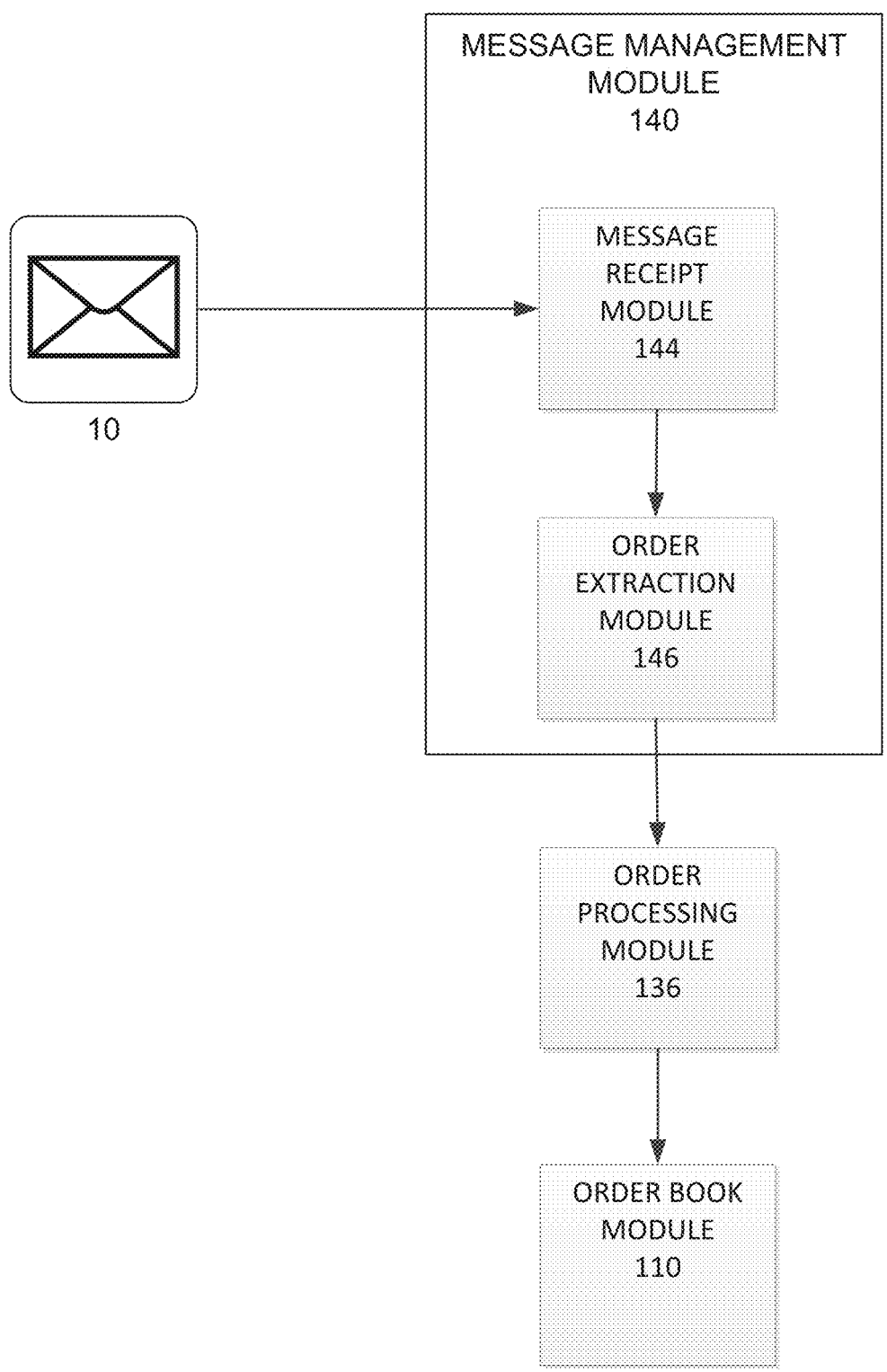
FIG. 1B depicts an example market order message management system for implementing the disclosed embodiments.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. FIG. 1B provides additional details for the message management module 140.

As will be described, the disclosed data entitlement system may be implemented as part of the exchange computing system 100. However, it will be appreciated that the disclosed mechanisms may be implemented at any logical and/or physical point(s), or combinations thereof, at which the relevant information/data may be monitored or is otherwise accessible or measurable, including one or more gateway devices, modems, the computers or terminals of one or more market participants, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example the modules may be embodied as part of an exchange computing system 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

As shown in FIG. 1A, the exchange computer system 100 further includes a message management module 140 which may be used for managing electronic messages containing financial data sent between an exchange and a plurality of market participants, or vice versa. However, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

FIG. 1B illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements, and may be configured as part of the order book module 110, part of the message management module 140, or as an independent functioning module.

The embodiments described herein utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic message packets may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of officials related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other orders counter thereto.

In an embodiment, an event occurrence may be detected. The event occurrence may be the occurrence of an event that was specified as other information relating to an order extracted from an electronic message. The event may be a triggering event for a modification or cancelation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of on-going public statements of officials who may be in a position to impact markets, such as Congressional testimony of the Chairperson of the Federal Reserve System.

The other, secondary, or supplemental action may also be considered a modification of a first action executed with respect to an order. For example, a cancelation may be considered a cancelation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail below. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

An electronic market may then attempt to match the incoming order to buy or sell with an appropriate counter order to buy or sell. As such, the electronic market may generate and/or execute trades of financial products between market participants. Further, the attempts to match may be enhanced by providing that some orders to buy or sell in the electronic market are given priority in matching over other orders in the electronic market. As such, an identical order to buy or sell, i.e., an identical volume at an identical price, may be differentiated based on assigned priorities such that the order of the identical orders having a higher priority is matched prior to the order having a lower priority. Priorities may be determined using various techniques. In an embodiment, orders may be assigned priority deterministically, that is orders may be assigned priority based on when an order was placed in an electronic market, such that orders placed earlier may have higher priorities. Another technique for determining a priority for an order may be based on the quality value, or a market quality index ("MQI"), indicative of the market participant's quality of market activity, of an order. For example, orders having a better MQI, i.e., a smaller value, may be filled or otherwise selected for matching over and/or prior to orders having a worse MQI, i.e., a larger value.

Data indicative of attempts to match incoming orders may also be saved. The data may be stored in any device, or using any technique, operable to store and provide recovery of data. For example, a memory 204 or computer readable medium 210, may be used to store data, as is described with respect to FIG. 2.

The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book module 110, as associated with particular market participants.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. This priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 136, and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

In the exemplary embodiments, all transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074,675, filed on Nov. 7, 2013, published as U.S. Patent Publication No. 2015/0127516, entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

Upon receipt of an incoming order to trade in a particular financial instrument, whether for a single-component financial instrument, e.g., a single futures contract, or for a multiple-component financial instrument, e.g., a combination contract such as a spread contract, a match engine, as will be described in detail below, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all). Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data, as was described above, reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price.

The exchange computer system, as will be described below, monitors incoming orders received thereby and attempts to identify, i.e., match or allocate, as will be described in more detail below, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

As was noted above, an exchange must respond to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstances, such as to correct errors or improve operation, so as not to disrupt trader expectations. It will be appreciated that different products offered by a particular exchange may use different matching algorithms.

One exemplary system for matching is described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counter-party orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract.

The third leg may consist of buying a third contract. The price of a butterfly spread product may be calculated as:

$$\text{Butterfly} = \text{Leg1} - 2 \times \text{Leg2} + \text{Leg3} \qquad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus an exchange may match outright orders, such as individual contracts or spread orders (which as discussed above could include multiple individual contracts). The exchange may also imply orders from outright orders. For example, exchange computer system 100 may derive, identify and/or advertise, publish, display or otherwise make available for trading orders based on outright orders.

For example, two different outright orders may be resting on the books, or be available to trade or match. The orders may be resting because there are no outright orders that match the resting orders. Thus, each of the orders may wait or rest on the books until an appropriate outright counteroffer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 142.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

The disclosed embodiments may be implemented in a data transaction processing system that processes data items or objects. Customer or user devices (e.g., computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to buy or sell a quantity of a product at a given value. The instructions may also be conditional, e.g., buy or sell a quantity of a product at a given value if a trade for the product is executed at some other reference value. The data transaction processing system may include a specifically configured matching processor that matches, e.g., automatically, electronic data transaction request messages for the same one of the data items. The specifically configured matching processor may match electronic data transaction request messages based on multiple transaction matching parameters from the different client computers.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on an object. For example, an order book converted to an object may be represented by an Ask queue and a Bid queue. Resting messages or orders associated with the respective financial instrument may be stored in the appropriate queue and recalled therefrom.

The disclosed embodiments relate to data dissemination via electronic messages and data feeds, such as messages generated by an exchange computing system and sent to market participants, e.g., market data feeds.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Inbound messages may be sent from market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds, discussed further herein. As used herein, the terms "data feed" and "data stream" may refer to a sequentially or serially communicated set of related data/data messages, each of which may be transmitted/communicated, automatically or responsive to a request therefore, to a recipient in real time or a substantial approximation thereof, e.g. as they are generated, or at a later time subsequent thereto at a fixed or variable rate, e.g., synchronously or asynchronously. It will be appreciated that a data feed may refer to a specific set of related data messages, e.g. those reflective of changes to a particular electronic market which may include data messages which have yet to be generated or transmitted, while a data stream may refer to the subset of those data messages which have already been generated or are presently in transit.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to in one embodiment as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

Accordingly, an acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" or Market By Order "MBO" format, e.g., an object result message or object change message, respectively). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index. Market data feeds may be characterized as providing a "view" or "overview" of a given market, an aggregation or a portion thereof or changes thereto. For example, a market data feed, such as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages carry much more data because they reflect any market impacting change. Furthermore, because specific orders, but not the submitting traders thereof, are identified, other market participants may be able to follow that order as it progresses through the market, e.g., as it is modified, canceled, traded, etc.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. As such, MBP and MBO feeds may refer to categories/variations of market data feeds, distinguished by whether they provide an indication of the current state of a market resulting from a market impacting event (MBP) or an indication of the change in the current state of a market due to a market impacting event (MBO).

While the disclosed embodiments will be discussed with respect to an MBP market data feed, it should be appreciated that the disclosed embodiments may also be applicable to an MBO market data feed.

Market data is configured and formatted so that an end user of the market data, e.g., a trader, requires one or more software packages, typically provided by software vendors, to view and consume the market data. For example, a software vendor may receive market data from an exchange, and use the data as part of a software package that allows traders to place trades based on the market data. The software package may include a specific configuration of user interface screens, information layout, and user interaction (e.g., clicking on screen data objects to perform actions, such as purchasing futures or options contracts). At least some of the interactions between the user, e.g., trader, and the software may be based on the market data viewed or accessed within the software package.

The software vendor may provide additional features such as charting and/or analytics, etc. The software vendor may distribute the data generated by the exchange computing system as part of the software package provided to end users or the data consumers. In some cases, traders may select software vendors based on their preferences of the value-add features. The software vendor may bundle integrated trading screens and market data viewing functionalities in the software. The software vendors may accordingly be considered to be data redistributors, because the data is re-packaged and redistributed within the software packages.

The software vendors may additionally or alternatively be considered to be data modifiers or enhancers, because they may modify or enhance the data before allowing the data consumers/influencers access to the data. In one embodiment, a software vendor may customize or enhance market data, as described in U.S. application Ser. No. 14/074,666, filed Nov. 7, 2013, published as U.S. Patent Publication No. 2015/0127512 A1, entitled "Transactionally Deterministic High Speed Financial Exchange Having Improved Efficiency, Communication, Customization, Performance, Access, Trading Opportunities, Credit Controls, And Fault Tolerance", the entirety of which is incorporated by reference herein and relied upon.

In one embodiment, market data feeds may be customized, e.g. field order, custom additional fields, removal of unnecessary fields, custom data format/protocol, etc., to the preferences of the recipient thereof, such as a subscribing market participant, without prejudicing the latency of the data as compared with the transmission of the market data feed to other recipients, e.g. subscribers to a differently customized market data feed, non-subscribers receiving the generic/standard market data feed, etc. Customizations may include customized augmentation of the market data with additional "value added data" whereby optional data values, such as Greeks, or other analytics, etc., ordinarily computed/derived by a recipient upon receipt of market data, can be pre-computed/pre-derived and inserted into the market data prior to transmission to a subscribing recipient, alleviating the need for the recipient to implement such computations upon receipt. The software vendors may distribute, or modify and distribute, the data as described herein.

Figure 3:
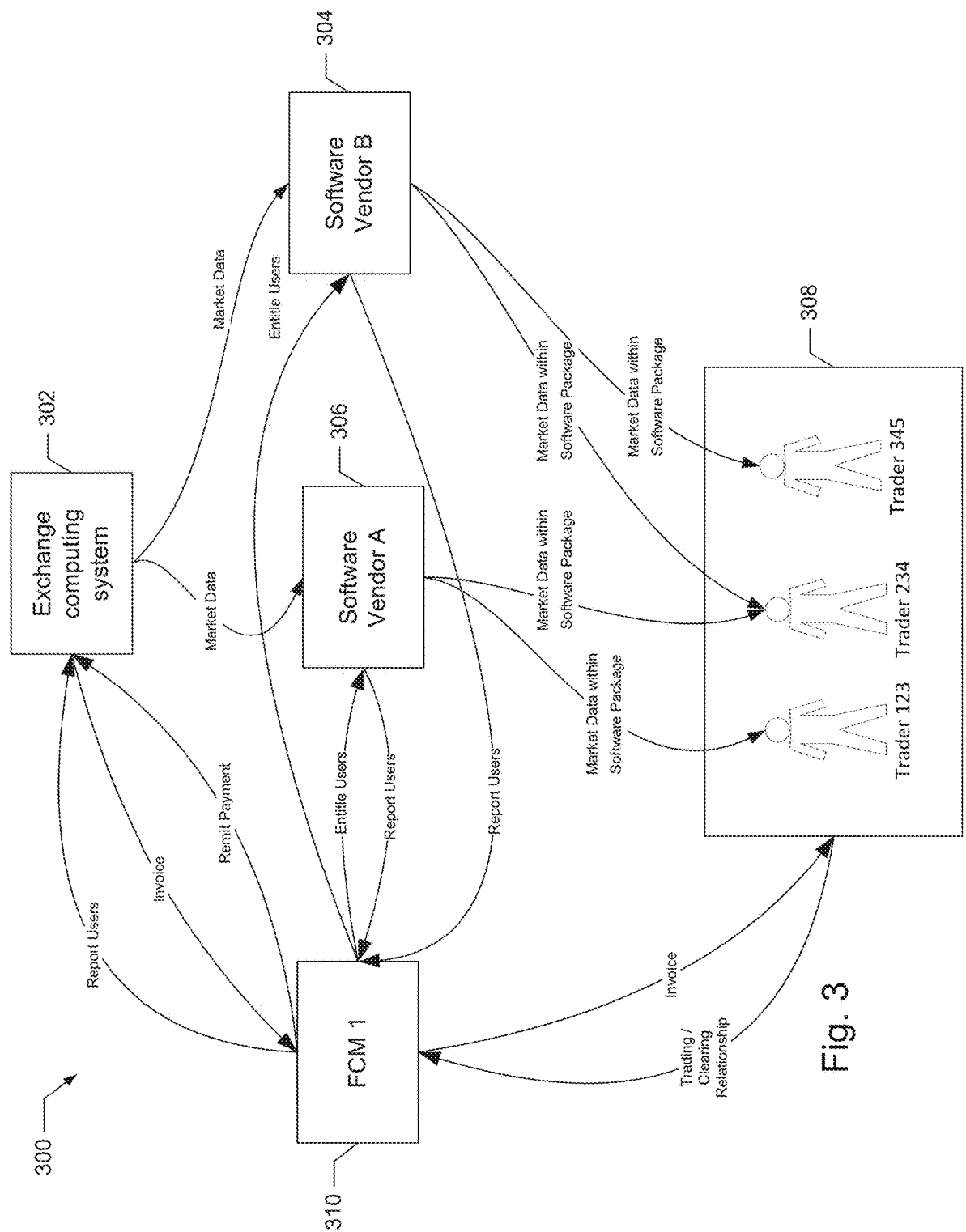
FIG. 3 illustrates an example data diagram for an exchange computing system generating data which is accessed and controlled by different entities.

FIG. 3 illustrates an example data flow diagram 300 depicting data flows between various entities which, as described below, may implement and/or operate participant computing systems. An exchange computing system 302, which may be, may include or be coupled with, a data generator participant computing system, may provide multiple feeds of market data to software vendors 304 and 306, which may implement, include or be coupled with, a data redistributor participant computing system, who in turn make one or more of the market data feeds available, e.g., as part of a software package or service, to traders 123, 324 and 345, all of whom who may be individual traders within, or associated with, Trading Firm 308, who may implement include or be coupled with one or more data consumer participant computing systems. Again, as discussed herein, traders and trading firms use the software packages provided by software vendors in order to consume, access, and/or act upon the market data feeds. Different traders within the same firm may be approved for receiving different data feeds.

The market data feeds are accordingly structured so that, in one embodiment, the data contained therein can be interpreted and interacted with in a variety of ways. For example, several different companies or entities 304 and 306 may develop and offer software to traders at various trading firms, e.g., trading firm 308. The traders may use one or more different software packages to view and act on the market data. Thus, the software vendors may receive the data directly from the exchange computing system, and then publish it to individual traders or trading firms depending on whether the traders or firms are entitled to the various market data feeds.

Trading Firm 308 may have a trading and clearing relationship with Futures Commission Merchant ("FCM") 310, i.e., the FCM executes trades on behalf of the traders associated with Trading Firm 308 and clears the resulting trades. Futures Commission Merchant 310 may have relationships with several different, e.g., hundreds, of trading firms. Moreover, Futures Commission Merchant 310 may have relationships with several different, e.g., dozens, of software vendors.

In particular, the FCM 310 may instruct different software vendors as to which traders within which trading firms should receive which market data feeds. The software vendors may then report to the FCM which traders actually received certain market data feeds. The FCM then reports traders' market data usage to the exchange computing system that generated the market data feeds, and the exchange computing system charges the FCM for the traders' market data usage, who in turn charges the trading firms associated with the traders that used certain market data feeds. For example, the exchange computing system 302 may invoice the FCM, who may pay the exchange computing system on behalf of the traders, and may separately invoice the traders.

To summarize, the exchange computing system generates market data, but because different traders use different/more than one software packages to consume/use the data, the exchange computing system may relinquish control of the market data to software vendors, who are independent of the exchange computing system and actually control which traders receive which market data. Because of complex permissioning and payment systems, the exchange computing system may not be able to easily exercise control over or visibility into which traders used the exchange computing system's market data feeds. Moreover, billing and payment for the usage of market data occurs after the market data has been utilized/consumed.

The disclosed embodiments involve implementing a shared data structure, such as a distributed electronic ledger, to manage digital assets, and controlling the flow of market data between entities and computers based on the digital assets, which in one embodiment may be implemented as digital tokens.

In one embodiment, the distributed electronic ledger may be a permissioned ledger. The different entities and computers may have different roles and/or permissions to interact with the distributed electronic ledger. An example ledger such as the Ethereum decentralized application platform or HyperLedger may be used to implement the distributed electronic ledger.

One entity type in the electronic ledger network may have the role of generating/writing, or permissions to generate/write, a data entitlement request on the distributed electronic ledger, which, in one embodiment, may be a data consumer participant computer system, which are entities that use the data and influence future values of the data. However, any of the entities involved in the distributed electronic ledger may place or write a data entitlement request on the distributed electronic ledger. In an exchange environment, a trader or trading firm that places trades, or initiates transactions with a hardware matching processor, may be a data consumer participant and may implement or otherwise operate a data consumer participant computer system as described herein, and may additionally request data via a data entitlement request.

One entity type in the electronic ledger network may be a data generator participant computer system, which may have the role of reading, or permissions to read, the data entitlement request and the role of generating/writing, or permissions to generate/write, a data entitlement asset on the distributed electronic ledger. In one embodiment, the entity that generates the data entitlement asset may be the same entity that generates the data that is requested via the data entitlement request. In an exchange environment, the exchange computing system, such as CME, may be a data generator participant and may implement or otherwise operate a data generator participant computer system as described herein.

Another type of entity in the electronic ledger network may be a data redistributor participant computer system, which may have the role of querying, or permissions to query, the distributed electronic ledger for the existence of a data entitlement asset associated with one or more other entities. In an exchange environment, a software vendor that provides a user interface for traders may be a data redistributor participant which may implement or otherwise operate a data redistributor participant computer system as described herein.

In one embodiment, the software package provided by software vendors may allow traders to act upon the received data, e.g., trade, which in turn causes modifications to the data on the exchange computing system which needs to be again reported back to the traders.

Thus, data flow within an exchange environment, in one embodiment, may be considered to be circular, or part of a feedback loop. In particular, the exchange computing system generates and owns data that reports upon match engine activity. As described herein, market data feeds are based on data generated by the exchange computing system. Moreover, the market data feeds, reflect market activity based in part on the order books and the hardware matching processing of the match engine. The market activity, i.e., modifications to the orders books based on match engine activity, is based on, or is the direct result of, transactions due to instructions submitted by traders via financial messages, which are submitted by the same traders and trading firms who are consuming the market data generated by the exchange computing system. Said another way, traders and trading firms are data consumers and influencers that submit financial messages to the exchange computing system, causing changes to the market or positions for financial instruments/order books implemented as data objects, and the exchange computing system (i.e., the data generator) reports changes back to the traders (i.e., data influencers and consumers) via market data feeds. In practice, the data influencers consume the data via complicated software interfaces and packages, which are provided by software vendors. Thus, the exchange computing system provides the market data to the software vendors or data redistributors, who incorporate the market data into their software packages and provide an actionable view of the market data to the data influencers.

In one embodiment, the data consumers may simply read the data, but not influence the data.

Figure 7:
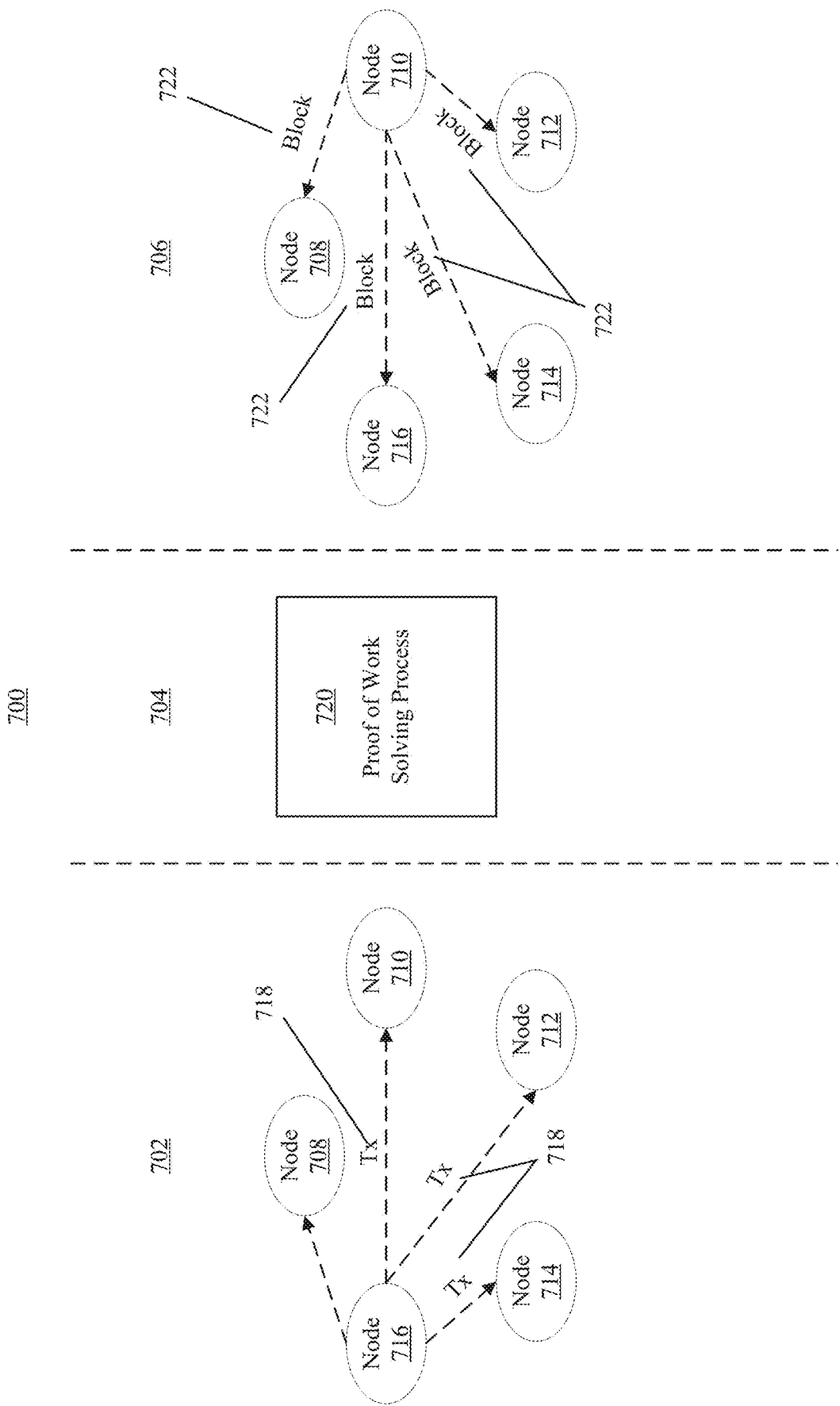
FIG. 7 depicts example operation of an illustrative implementation of the bitcoin blockchain.
Figure 8:
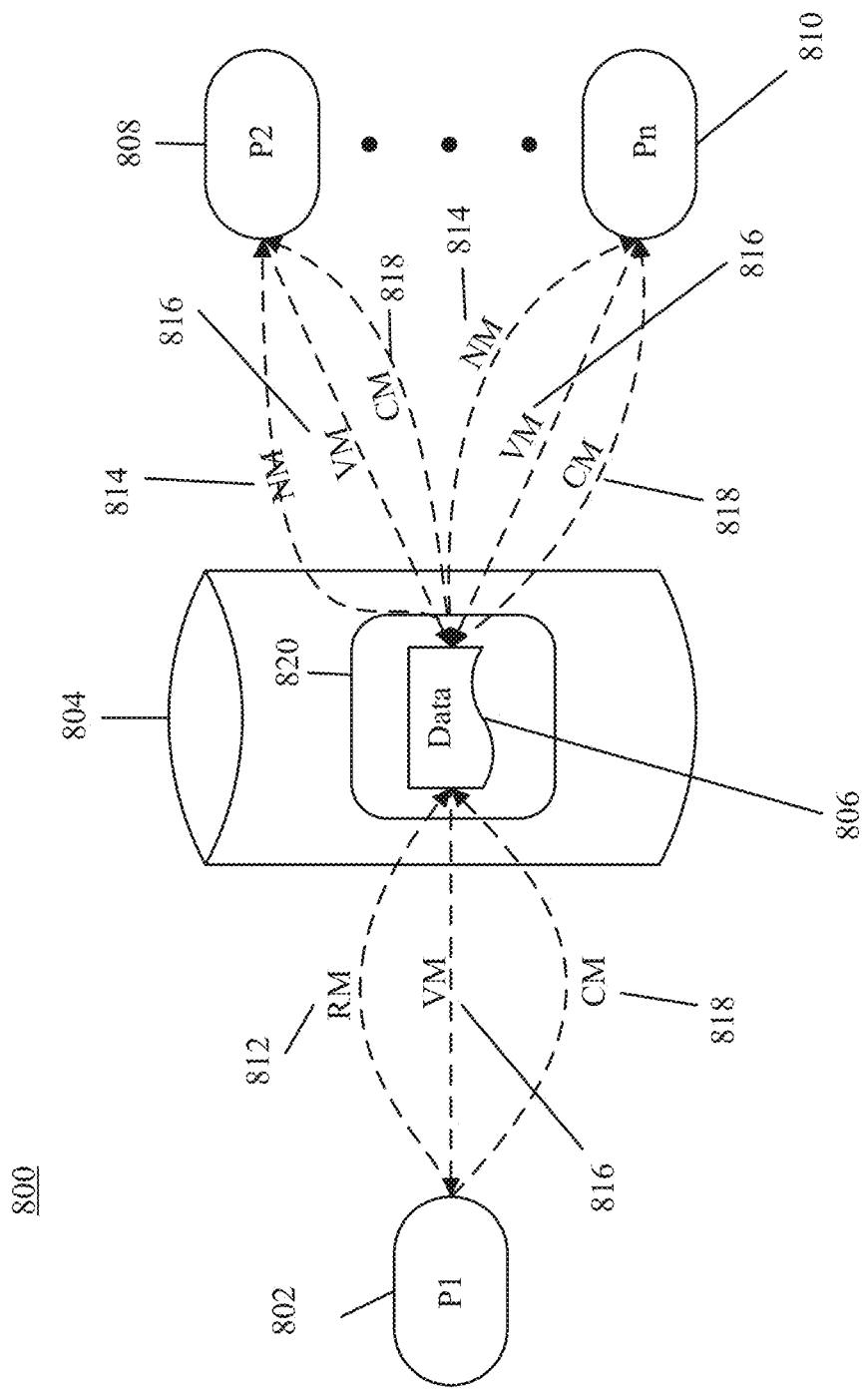
FIG. 8 depicts example operation of an illustrative system which implements a bilateral assertion model according to one embodiment.

Referring now to FIGS. 7 and 8, FIG. 7 depicts an example operation of an illustrative implementation 700 of the bitcoin Blockchain which may be used to track the logical movement of digital assets among the participants, e.g. bitcoins, and which may include three stages of operation as shown, a transaction stage 702, a proof of work stage 704, and a block confirmation stage 706. FIG. 7 also shows nodes 708, 710, 712, 714, and 716, representative of participants in the bitcoin Blockchain. In the transaction stage 702, node 716 communicates a transaction 718 to every other node. A transaction may consist of one participant to the transaction associated with a node sending a bitcoin to another participant to the transaction associated with a different node. As the other nodes 708, 710, 712, 714 receive transaction 718, the transaction is grouped together with other prior transactions into a block. A block may include a number of transactions. The number of transactions which may be grouped together into a block may be limited to a maximum number of transactions before the block is "closed" and a new block is opened. In one embodiment, once the maximum number of transactions in the block is reached, a node that has received the block may begin the proof of work solving process 720 during the proof of work stage 704.

During the proof of work stage 704, every node 708, 710, 712, 714, and 716 that has begun the proof of work solving process 720 may attempt to solve a mathematical equation which allows the nodes 708, 710, 712, 714, and 716 to confirm the veracity of the block via validation of a solution to the mathematical equation. The mathematical equation to be solved is asymmetric, i.e. it is an equation which is difficult to solve, e.g. resource/time intensive, but where the solution is easy to validate, such as the computation of a particular hash value. Once one of the nodes 708, 710, 712, 714, and 716 confirms the veracity of a block, the solving node 708, 710, 712, 714, and 716 broadcasts the confirmed block to every other node 708, 710, 712, 714, and 716 at the block confirmation stage 706. As shown in the exemplary operation depicted in FIG. 7, node 710 completed the proof of work involving the transaction 718, and broadcasts the block 722 to each other node.

While blockchain may be an appropriate mechanism for implementing digital currencies like bitcoin due to its asset tracking properties which act as protections against double spending, etc., its public/replicated nature also creates security and confidentiality issues. In a blockchain, all transactions are visible to all participants. Accordingly, in blockchain if a member of the system has their private cryptographic key stolen then a bad actor, using that stolen key, can not only see all of that member's previous transactions but can further create fraudulent future transactions having the appearance as having been initiated by the member.

FIG. 8 depicts example operation of an illustrative system 800 for interacting with a shared data structure according to one embodiment. FIG. 8 includes example participants 802, 808, and 810. The system 800 may utilize any number of participants 802, 808, 810 from P1 . . . Pn. A participant 802, 808, 810 may interact with the system 800 in one or more of a variety of roles, including, but not limited to: as a party to a transaction (a proposer of the transaction, an asserter of fact or agreement, an issuer of a credential, authorization, license, certification/certificate, or accreditation etc.); as a counterparty to a transaction; as a witness to a transaction; and/or as a watcher to a transaction. It will be appreciated that not all of these roles may be implemented and/or additional and/or alternative roles may be implemented.

A party to a transaction may be a participant who proposes a transaction or otherwise makes an assertion to another participant, which would be referred to as a counter party. A witness is one who receives a copy of a transaction, i.e. "listens," and attests, e.g. cryptographically signs and validates, that they saw, i.e. received and comprehended, a transaction between the party and the counter party participants. Witness participants may serve a notarial or regulatory role. While a witness may not know the nature of the transaction or assertion, e.g. due to encryption thereof, as will be described, they are aware that that the transaction or assertion exists, via the receipt of a copy thereof, and they are aware of the party and counter party participants and can attest to, e.g. confirm/validate, the existence of the transaction and parties thereto. For example, with respect to a transaction between two participants in which the first party undertakes an obligation to the second party, the witness participant may be able to attest to the existence of the transaction and that the parties thereto, but, due to encryption, the witness may not know of the details of the obligation. A watcher is a participant that listens to, i.e. receives a copy of, and, and may record, i.e. store a copy of, a transaction, but does not attest to it, i.e. does not provide confirmation or validation. A watcher participant may serve a notarial or regulatory role or merely provide transactional integrity against improper behavior, such as where a catastrophic failure comprises the data structures of multiple participants or otherwise results in only one participant having the ability to reconstruct lost transactions and that participant knowingly or unintentionally fails to provide complete or accurate data. Parties, counterparties, and/or witnesses to transactions may all be required to validate transactions for the transactions to be complete as will be described. Watchers to transactions may be made aware of transactions, i.e. receive copies, but may not validate the transactions like parties, counterparties, and witness. Conversely, participants 802, 808, 810 in the system 800 that are not involved in a transaction would not be made aware of that transaction.

The system 800 shown in FIG. 8 includes a data structure management system 804 in which data 806 is stored in a data structure 820. As shown in FIG. 8, the participants 802, 808, 810 and the data structure management system 804 interact via the communication of data transaction messages, which may be referred to as implicit messages, such as via a communications network, not shown in FIG. 8, which may be the network 220 shown in FIG. 2 and described herein with respect thereto.

Exemplary data transaction messages include request data transaction messages 812, notification data transaction messages 814, validation data transaction messages 816 and response data transaction messages 818. Request data transaction messages 812 may include data indicative of one or more proposals, such as a proposal of an agreement or other proposition or assertion of an opinion, or an assertion, such as an assertion of fact, e.g. an assertion of the existence of an agreement, an authorization, a license, a certification, an accreditation, a statement of intention, e.g. an intention to create, modify or remove data, an assertion of a revocation of an agreement, authorization, license, certification or accreditation, etc.

Once an assertion is made and validated, as described, it may form a logically/effectively permanent unalterable record, i.e. as viewed by the parties, users of the system. Accordingly, to effect a change to that assertion, a subsequent assertion, once validated, may act to supersede or modify a previous validated assertion, such as by acting as a revocation to revoke the prior assertion, an addendum to add additional parameter, an amendment to alter terms and/or, a novation to alter the parties to a prior assertion, etc. As can be seen then, and as discussed in more detail below, as the original assertion remains unaltered, to understand the present state/understanding of that assertion, it may need to be viewed in the context of, e.g. netted with, any subsequent assertions.

Generally a request data transaction message 812 may comprise data indicative of a request to store new data in the data structure management system 804. A notification data transaction message 814 includes data indicative that a request data transaction message has been received by the system 800 and includes data indicative of that received request and may further include a request to the recipient to validate the received request or other indication that the recipient is to validate the requested change to the data structure 820. Notification data transaction messages 814 may be automatically generated and transmitted upon receipt of a request data transaction message 812. A validation data transaction message 816 comprises data indicative of a participant's validation of a requested change to the data structure 820, e.g. a response to a request to validate a received request data transaction message, which may include data indicative of a confirmation or a rejection of the received request data transaction message. A response data transaction message 818 includes data indicative of the system's 800 response to a request data transaction message, e.g. based on the received validation data transaction messages, e.g. that the requested transaction was performed or not. Response data transaction messages 818 may be communicated, as will be described, to all participants participating in the transaction so as to convey the result thereof.

All of the data transaction messages discussed above may be received asynchronously and trigger the actions listed below. In other words, while one request is processing, another request may come in, and notifications and validations may be received, etc. In one embodiment, data is stored in the data structure organized by "entries" where each entry contains the data indicative of one or more proposals/assertions along with data indicative of any requisite counter-party and/or witness attestations, e.g. cryptographic signatures, as will be explained in more detail below.

The collective contents of an entry may reflect the state of the transaction represented by those contents. For example, if an entry contains the proposed assertion only, and no validations, the state of that assertion is "proposed" or "incomplete." As the requisite validations, witness attestations, etc. are received and data indicative thereof stored into the entry, the state of the entry changes, e.g. to "in process," until all requisite validations, witness attestations, confirmations, etc., are stored in the entry, upon which the state of the entry may be considered to be "validated" or "complete." Data indicative of a "validated", "attested to" or "confirmed" state may be stored in the entry and updated as new data is stored into the entry or, alternatively, the state may be determined by reviewing which of the requisite data is stored in the entry and which of the requisite data is still outstanding, i.e., not yet received. The described data transaction request messages may then operate with respect to particular entries, i.e. creating new entries or augmenting existing entries as described. As will be further described below in more detail, entries may further be organized based on the party/counter-party having an interest therein, e.g. the parties to the agreements or assertions indicated by the data contained within the entry. In particular, entries relating to a particular permutation of party/counter-party may all be stored together in a "partition" or other sub-division of the data structure. It will be appreciated that other organizations may be used, either more or less granular.

The shared data structure system, in one embodiment, allows for participants 802, 808, and 810 to submit requests to create new data, or modify existing data, and operate directly on the data itself. Put another way, the participants in the system 800 are able to directly operate on data in the shared data structure, and any participants interested in that data are automatically made aware of requests to create new data or modify existing data.

Various electronic mechanisms are used for storing data which multiple parties need to access, modify and/or maintain, including electronic ledgers and database managements systems.

A ledger may be a collection of entries (obligations, assertions, debts, credits, etc.) in a notebook or other physical or electronic form and are akin to a transaction log whereby the current "state" of a ledger may be ascertained by netting or otherwise totaling all of the entries up to the current time period. For example, "Party A loans $X to Party B" could be an entry representative of a transaction in a ledger. "Party B repays $X to Party A" may be a subsequent entry of another transaction in that ledger. The net result of these two entries is the extinguishing of the debt of B to A. Ledgers typically utilize double-entry book keeping whereby separate ledger entries, or separate ledgers, are maintained for each side (account/party) to a transaction and transactions are recorded as a pair of opposing transactions, e.g. credits vs. debits, to each respective account/party, either in the same ledger or in separate ledgers, each maintained by the respective party.

Ledgers may be held by individual parties, or ledgers may contain entries for multiple parties and be replicated/distributed amongst a variety of sources. A ledger which comprises many distributed copies may referred to as a replicated ledger. An example of an electronic replicated ledger is the "blockchain" methodology employed by the bitcoin digital currency. Generally, a block chain, or blockchain, is a distributed database that maintains a continuously-growing list of data records, typically hardened against tampering and revision. It consists of data structure blocks which, in some implementations, hold exclusively data and both data and programs in other implementations, wherein each block stores batches of individual transactions and the results of any blockchain executables. Each block typically further contains a timestamp and information linking it to a previous block. Effectively, blockchain is an electronic public replicated ledger in which transactions, such as those involving the cryptographic currency bitcoin, are recorded. Each of the replicated blockchains communicates with the others via a network, such as the Internet. The Bitcoin blockchain operates completely transparently, so all data is transmitted to, and is readable by, all participants in the bitcoin system. That is, each party in the bitcoin system, with some exceptions, maintains a copy of the ledger, stored by their own copy of the blockchain, in which copies of all transactions are recorded, referred to as "full replication." In the case of bitcoin, this replicated ledger makes all transactions "open transactions" and viewable by all participants on the blockchain network which is a necessary property required to prevent double spending of bitcoins, i.e., parties attempting to send the same bitcoin to multiple parties. This property of visibility of all transactions in the bitcoin network is also a drawback of a blockchain, because it does not allow for the confidentiality of transactions. Every participant in the bitcoin network has access to every transaction on the blockchain. This facilitates the ability to track digital assets, e.g. bitcoins. While the integrity of transactions recorded in each ledger is cryptographically protected, i.e. "signed," via a transacting party's privately held cryptographic key, if someone were to steal a blockchain/bitcoin user's private key, the thief would have all of the information necessary, e.g. the transactional record and the cryptographic key thereto, to be able to see all of the transactions to which the user is a party, and the thief would be able to create transactions using the private key without the consent of the true owner of the private key.

Using the replicated ledgers of blockchain along with cryptographically linking/chaining the transactions stored therein enable all users to ensure the reliability of the transaction data, i.e. that transactions are recorded accurately and subsequent thereto, protected from alteration, as each user has a copy of all of the transactions and any unintended alterations to a transaction, e.g. via errors or fraudulent activity, are readily detectable via both the cryptographic discrepancies within the chained transactions that would be created as well as the discrepancies that such alterations will create among the various copies of the blockchain ledger.

A database is a structured collection of information or content, typically held in a computer, e.g. stored in a memory or other storage device that can be readily accessed, managed and updated, for storing the current value or net/cumulative result of a series of transactions. As used herein, a database refers not only to the underlying data structure(s) which are used to actually contain data but also the mechanisms coupled therewith to enable access, management, updating, etc. Together, this may also be referred to as a database management system ("DBMS"). As opposed to a ledger which records a sequence of transactions, a database typically records only the net result of the performance of those transactions. While the transactions recorded in ledgers are periodically netted to determine a current state, databases reflect the current state of data as soon as a transaction has been "committed," i.e., the record in the database has been updated in manner considered to be permanent, e.g. visible to all users of that database.

Usually, the information is organized in a structured manner, i.e. using a particular format, protocol or structure for organizing and storing the data therein, and the information may be accessed, or edited via transactions, i.e. single database operations, according to a particular set of principles. In mission critical implementations where the reliability of the data stored in a database is desirable, databases may be implemented in accordance with certain properties which guarantee the reliable processing of transactions. The properties may include atomicity, consistency, isolation, and durability, commonly referred to as "ACID". Adherence to these properties by a database/DBMS helps to guarantee that database transactions are processed reliably.

Atomicity requires that each transaction be "all or nothing": if one part of the transaction fails, then the entire transaction fails, and the database state is left unchanged. An atomic system must guarantee atomicity in each and every situation, including power failures, errors, and crashes. To the outside world, a committed, i.e. completed, transaction appears (by its effects on the database) to be indivisible ("atomic"), and an aborted transaction does not happen.

The consistency property ensures that any transaction will bring the database from one valid state to another. Any data written to the database must be valid according to all defined rules, including constraints, cascades, triggers, and any combination thereof. This does not guarantee correctness of the transaction in all ways the application programmer might have wanted (that is the responsibility of application-level code) but merely that any programming errors cannot result in the violation of any defined rules.

The isolation property ensures that the concurrent execution of transactions results in a system state that would be obtained if transactions were executed serially, i.e., one after the other. Providing isolation is the main goal of concurrency control. Depending on the concurrency control method (i.e., using strict, as opposed to relaxed, serializability), the effects of an incomplete transaction might not even be visible to another transaction.

The durability property ensures that once a transaction has been committed, it will remain so, even in the event of power loss, crashes, or errors. In a relational database, for instance, once a group of SQL statements execute, the results need to be stored permanently (even if the database crashes immediately thereafter). To defend against power loss, transactions (or their effects) may be recorded in a non-volatile memory.

However, the ACID approach to database management has drawbacks. For example, most implementations of the ACID approach require that data/records in the database be locked while that data is being interacted with, e.g. modified. This may effectively serialize access to data by multiple requestors and impede any operations which are dependent thereon.

Many business applications rely upon centralized databases/DBMS's, i.e. a database under the control of single or central entity, which, because they do not feature the replicated structure of blockchain or the cryptographic chaining of transactions, are typically implemented as a System of Record. A system of record (SOR) or Source System of Record (SSoR) is data management term for an information storage system, e.g. a computer implemented database/DBMS that is designated as the authoritative data source for a given data element or piece of information. Accordingly, while other entities may maintain copies of the data stored by an SOR, in the event of dispute between the value of particular data as stored in the SOR and as stored in a copy, the value stored by the SOR will be considered the true value. The need to identify systems of record can become acute in organizations where management information systems have been built by taking output data from multiple source systems, re-processing this data, and then re-presenting the result for a new business use. In these cases, multiple information systems may disagree about the same piece of information. These disagreements may stem from semantic differences, differences in opinion, use of different sources, differences in the timing of the extraction, transformation, and loading operations that create the data they report against, or may simply be the result of bugs. The integrity and validity of any data set is open to question when there is no traceable connection to a good source, such as a known System of Record. Where the integrity of the data is vital, if there is an agreed system of record, the data element must either be linked to, or extracted directly from it. Generally, a "system of record" approach may be used where there is a single authority over all data consumers, and those consumers have similar needs.

Generally a system of record ("SOR") model is used for recording business related data such as transactions and agreements. In a SOR model, a trusted party holds and exclusively controls records of transactions in a centralized database. Individuals or other entities place their trust in the institution that hosts/controls the SOR, or otherwise agree that the SOR is the authoritative data source. Government and government agencies, financial institutions and even private/public companies may host/control the data and the SOR. For example, banks, 401k providers, utility companies, and many of the service agencies that people or business entities transact with are the SOR for that individual's or business entity's transaction records, e.g. account balance and/or transaction history with that service or agency. In the event of a dispute as to whether data in the SOR is correct as compared to another copy of that data which may differ, the institution that holds the SOR is typically deemed to have the correct data unless there is evidence to the contrary. Alternatively, when both parties are large institutions and neither institution is the SOR (e.g. two major financial institutions, such as two banks), messages are exchanged for every transaction and at the end of a period of time, e.g. at the end of the business day, a reconciliation process is undertaken by which each party validates their mutual understanding of each transaction which "seals" the transactions and, e.g. any end of day account balance resulting therefrom. In the event of a dispute, such as due to a bug, lost message or tampering, the parties must undertake a resolution process to determine the correct results, e.g. by reviewing network communication logs and/or transactional timestamps to determine the order of events. The SOR model, and the reconciliation process, referred to as a "trust and reconciliation" process, are commonly used in the implementation of electronic financial instrument trading systems.

As discussed in co-pending U.S. patent application Ser. No. 15/166,829, filed on May 27, 2016, entitled "Bilateral Assertion Model And Ledger Implementation Thereof" ("the '829 Application"), the entirety of which is incorporated by reference herein and relied upon, generally, transactions may be bilateral, or otherwise decomposed into component bilateral transactions, e.g. assertions, between two participants, referred to as a party and a counter-party. That is, for each data stored in the data structure, there are two interested participants having an interest in, or otherwise related to, that data, referred to as the party-participant and the counter-party participant.

A party-participant's attempt, request or other indication of an intent to change data in the data structure, e.g. to add new data or modify existing data, is implicitly communicated to the other counter-party participant identified as being interested in that data, e.g. via a request, or other communication reflecting an opportunity, to validate the change, to obtain the counter-party participant's validation, or otherwise cause them to validate, that the requested change is acceptable, e.g. according to that participant's own rules, such as may be dictated by business logic or business rules. The data being modified or added to the data structure may be indicative of an assertion, such as an assertion of fact or truth, a proposed agreement, an authorization, license, certification, accreditation, etc., or other statement of an intention to create, modify, or remove data from the shared data structure.

For example, communication of a participants request or intention to change data in the data structure may cause, e.g. automatically, the counter party-participant to evaluate the change according to business logic or business rules, such as via an external program or external review process, to determine whether the change is acceptable/valid. The business logic/business rules may comprise automated and/or manually performed evaluation, calculation, and/or verification rules and/or processes which determine the acceptability of the requested change to the counter-party participant. In one embodiment, the business logic/business rules may be a simple approval of any change without any further analysis wherein the validation indicates merely that the counter-party has received and is aware of the modification. Alternatively, where the requested change relates to a calculated value, either mathematical or logical, the business rules/business logic may recalculate the value, using the same or a different calculation methodology, and compare the proposed value with the recalculated value to determine whether they are equivalent or not. The business logic/business rules may further define, where the proposed value differs from the recalculated value, an acceptable range by which those values may differ. Other business rules/business logic may validate an assertion of fact against an independent source for that fact to confirm the veracity of the assertion. Still other business rules/business logic may define subjective or objective thresholds, value ranges, or sets of values, such as for measures of risk, as a specification for when an assertion is valid or not. Business rules/business logic could also simply implement a process to confirm that the recipient received the request and/or that a user, such as an auditor, logged, reviewed or was otherwise made aware of the request.

If the counter-party participant validates the intention of the party to change the data, e.g. responds to the validation request approving the requested change, e.g. acceding to the assertion of fact or agreeing to the proposed agreement, the data structure is updated in accordance therewith as both parties, who are the only parties interested in that data, have approved the change. If the counter-party participant responds to the validation request disapproving of the requested change, the data structure is not modified. The requesting party-participant is notified of the result, i.e. that the requested change was made or not, via a confirmation message. This validation acts to confirm the veracity of the assertion relative to the counter-party, i.e. it is the counter-party's assertion as to whether it considers the party's assertion to be true or not, or otherwise acceptable. Accordingly, the validation, where approving the modification, may serve as a confirmation, agreement, authorization, license, certification, accreditations, etc., or in the case where the validation disapproves of the modification, it may serve to indicate that the party is wrong/mistaken, is lying, there is a disagreement, that the party is not authorized, not certified, not licensed or not accredited. It will be appreciated that the semantics of the validation depend upon the semantics of the assertion.

It will be appreciated that the counter-party participant need not receive any confirmation message as it is already aware that if it approved the change, the change will be made, and if it did not approve the change, the change will not be made. In implementations using a shared data structure maintaining a single copy of the data to which all participants have access, each data record in the data structure may include specific and unique permissions defining which participants may access data stored therein, e.g. defining which participants may be permitted to attempt or otherwise request a modification the data in that particular data record and which other participants have an "interest" therein and should be notified as described above, where the permissions may vary for each data record in the data structure. It will be appreciated that such a shared data structure may be maintained by either party, or maintained separate therefrom, in such a manner as to provide the requisite access to parties to attempt to make modifications and receive implicit communications related thereto, as described. Exemplary implementations are described herein. If, in one implementation, the party and the counter-party participant were each maintaining their own copy of the data, the counter-party may reliably update this copy based on its response, i.e. be assured that its copy reflects the same state as the copy of the data structure maintained by the party, and avoid any need to later reconcile this copy.

In one embodiment, assertions which are rejected or otherwise disapproved of by the counter-party participant are not stored or otherwise reflected in the data structure. Alternatively, the proposed assertion, along with data indicative of the rejection or disapproval by the counter-party participant, are stored in the shared data structure to, for example, provide a record thereof. As used herein, an approved request to change data in the data structure may be referred to as making the requested change "visible" whereas a disapproved/rejected change is not made visible, wherein visibility refers the logical interpretation of the data stored or not stored in the data structure along with any additional data indicative of the approval or disapproval thereof.

In one embodiment, the shared data structure may be used to implement financial transactions where, for example, a party makes an assertion that they have available funds or credit in an account maintained by a financial institution. The financial institution's validation of that assertion then acts to confirm the availability of funds or credit. Subsequent assertions can then be made that the party has transferred funds to a receiving party or otherwise withdrawn funds resulting in a reduced balance. In another example, a mortgage applicant, e.g. a buyer of real property, may make an assertion to a financial institution comprising statements as to the applicant's qualifications, e.g. their responses to a mortgage application/questionnaire, wherein the financial institution, subsequent to reviewing the assertions against their business logic/rules for lending, validates the assertions, the validation being indicative of the availability of funds. During the closing process, the validation may then further trigger disbursement of the funds, such as via a subsequent assertion by the buyer to the seller establishing the payment.

In an implementation of a substrate for the implementation of the shared data structure, as will be described, the data structure may be subdivided into portions, each of which is maintained by one of the participants to store copies of data in which they have an interest, i.e. selectively replicated. The counter-party participant may maintain their own copy of the data in which they have an interest, the counter-party participant, upon approving of the request can immediately update any copy of the data that they have in accordance with the requested change, as it is assured that the requested change, which was submitted by the requesting party participant, has already been approved by the requesting party participant. As such, the counter-party participant's copy of the data is immediately reconciled. Herein such reconciliation may be referred to as real time or self-reconciliation or that the data structure is real time or self-reconciling, immediately reconciled, reconciled in real time or inherently reconciled. Furthermore, as data is only replicated selectively, i.e., only among the sub-divided portions of the data structure belonging to the participants which have an interest in that data, unnecessary data transmissions and replication are avoided and, as will be seen, the security of the data is thereby improved.

For example, in one embodiment, a computer implemented method for implementing a real time reconciling shared data structure may be utilized to implement the disclosed data entitlement system. The shared data structure may be stored in a memory, and a portion of the shared data structure may be coupled with a processor. The computer implemented method may comprise receiving a data transaction message from a participant of the plurality of participants, and determining whether the received data transaction message comprises a request data transaction message comprising data indicative of a request by the participant to modify data, e.g. modify existing data or add new data, stored in the portion of the shared data structure or a notification data transaction message comprising data indicative that a request has been made to modify data stored in another portion of the shared data structure.

The shared data structure may utilize implicit communications to allow any participant to make any assertion to any other participant which are validated by other interested parties via further implicit communications. Such a system may allow for recording transactions as a series of bilateral assertions. Such transactions may be recorded atomically, making sure all transactions are valid before commitment. Assertions or transactions may represent any data that is mutually acceptable. One use case for such a shared data structure could be to eliminate business level messaging, such as the request/response messages used in traditional clearing models for financial exchanges, e.g. messaging used to perform transaction confirmation and data reconciliation.

Referring back to FIG. 4, FIG. 4 illustrates an example data diagram 400 including details about data generation, flow, control and permissioning between multiple entities via digital assets accessed and manipulated on a distributed electronic ledger, as described herein. For example, the distributed electronic ledger may be a modification of a blockchain methodology employed by the bitcoin digital currency. The distributed electronic ledger may be based on a bilateral assertion model ("BAM"), or an electronic ledger implementation of BAM, as disclosed by Applicants in the '829 Application.

Figure 4:
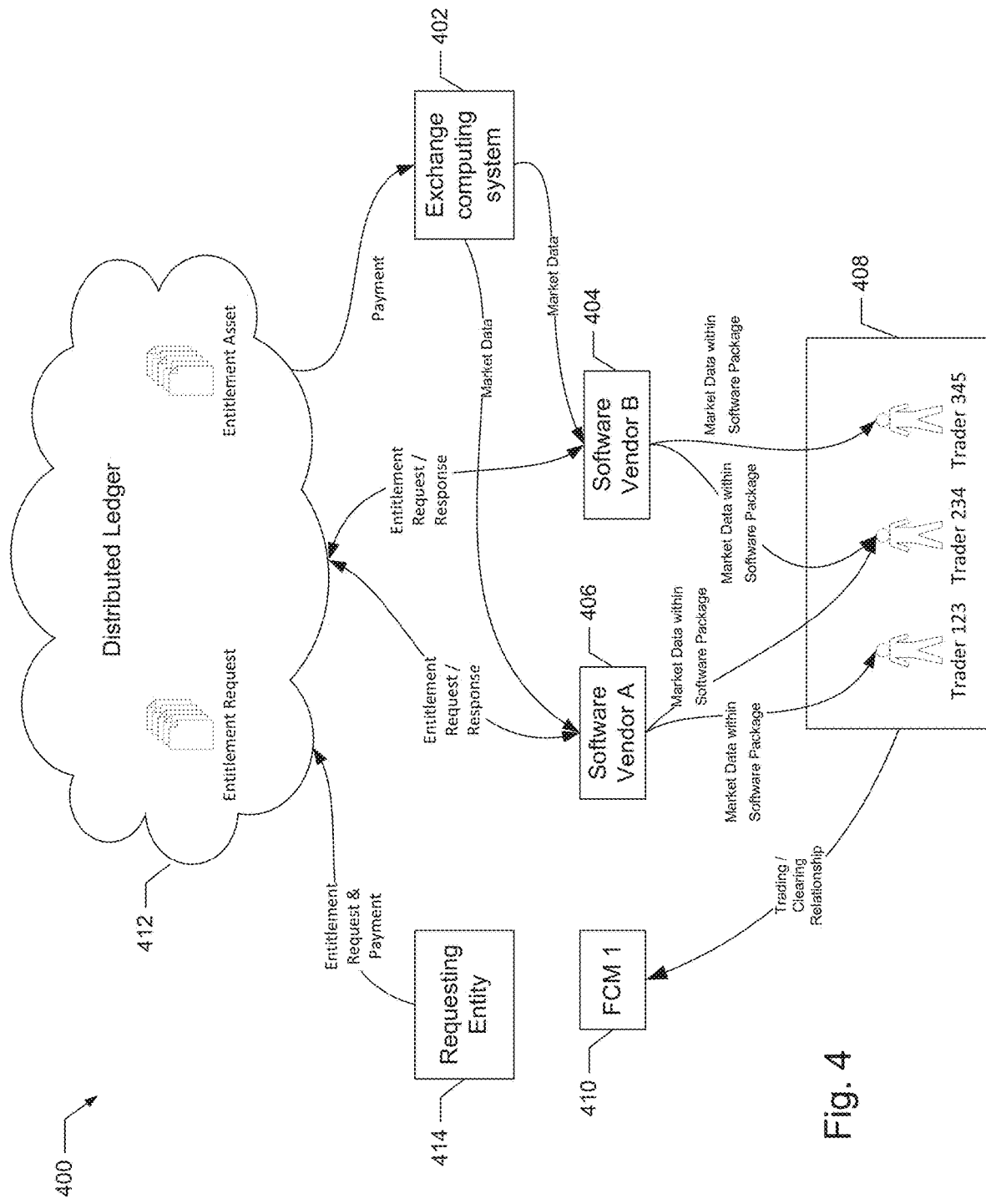
FIG. 4 illustrates an example data diagram used to implement aspects of the disclosed embodiments.

FIG. 4 includes an exchange computing system 402 that generates a large volume of data, e.g., various market data feeds. The market data feeds may be structured so that, in one embodiment, the data contained therein can be interpreted and interacted with in a variety of ways. For example, several different companies or entities 404 and 406 may develop and offer software to traders at various trading firms, e.g., trading firm 408.

Trading Firm 408 may have a trading and clearing relationship with FCM 410, i.e., the FCM executes trades on behalf of the traders associated with Trading Firm 408 and clears the resulting trades. Futures Commission Merchant 410 may have relationships with several different, e.g., hundreds, of trading firms. Moreover, Futures Commission Merchant 410 may have relationships with several different, e.g., dozens, of software vendors.

The exchange computing system may be configured to write data to a distributed electronic ledger 412. The distributed electronic ledger 412 may include features such as:

An identity system whereby assets can be represented as owned by an entity identifier;

Ability for an entity to prove its identity in response to a challenge, e.g., via proving knowledge of a private key corresponding to a public key associated with the user and/or the user's ownership of assets;

Ability to transfer cash assets between parties;

Ability to include data or a reference to data on a cash transfer;

Ability to issue and transfer non-cash assets; and/or

"Smart contract" capability that can automatically perform programmed actions in response to distributed electronic ledger activity.

Other entity types and/or their computers may read, write and/or access data stored on the distributed electronic ledger. A requesting entity 414 may be able to write data to the distributed electronic ledger 412. For example, an FCM may place a data entitlement request on the distributed electronic ledger on behalf of, or to provide data to, a trader or trading firm.

It should be appreciated that, in one embodiment, any one of the entities associated with the distributed electronic ledger may place a data entitlement request (as well as a payment or value transfer) on the distributed electronic ledger.

Because the distributed electronic ledger, in one embodiment, automatically notifies different entities of activity on the distributed electronic ledger, the exchange computing system may be automatically notified of the data entitlement request. In response, the exchange computing system may generate and place a data entitlement asset on the distributed electronic ledger, as discussed in further detail below.

A software vendor, such as software vendors 404 and 406, may be able to query the distributed electronic ledger for information contained therein, including whether or not a data entitlement asset exists on the distributed electronic ledger for a specific trader or trading firm requesting access to exchange computing system generated/owned data.

In one embodiment, the requested data as well as the data entitlement asset may be stored on the distributed electronic ledger. Alternatively, the requested data may be published or distributed outside of the distributed electronic ledger, and the data entitlement asset on the distributed electronic ledger may be used to unlock or check whether an intended recipient should indeed receive the exchange computing system owned/generated data.

Figure 2:
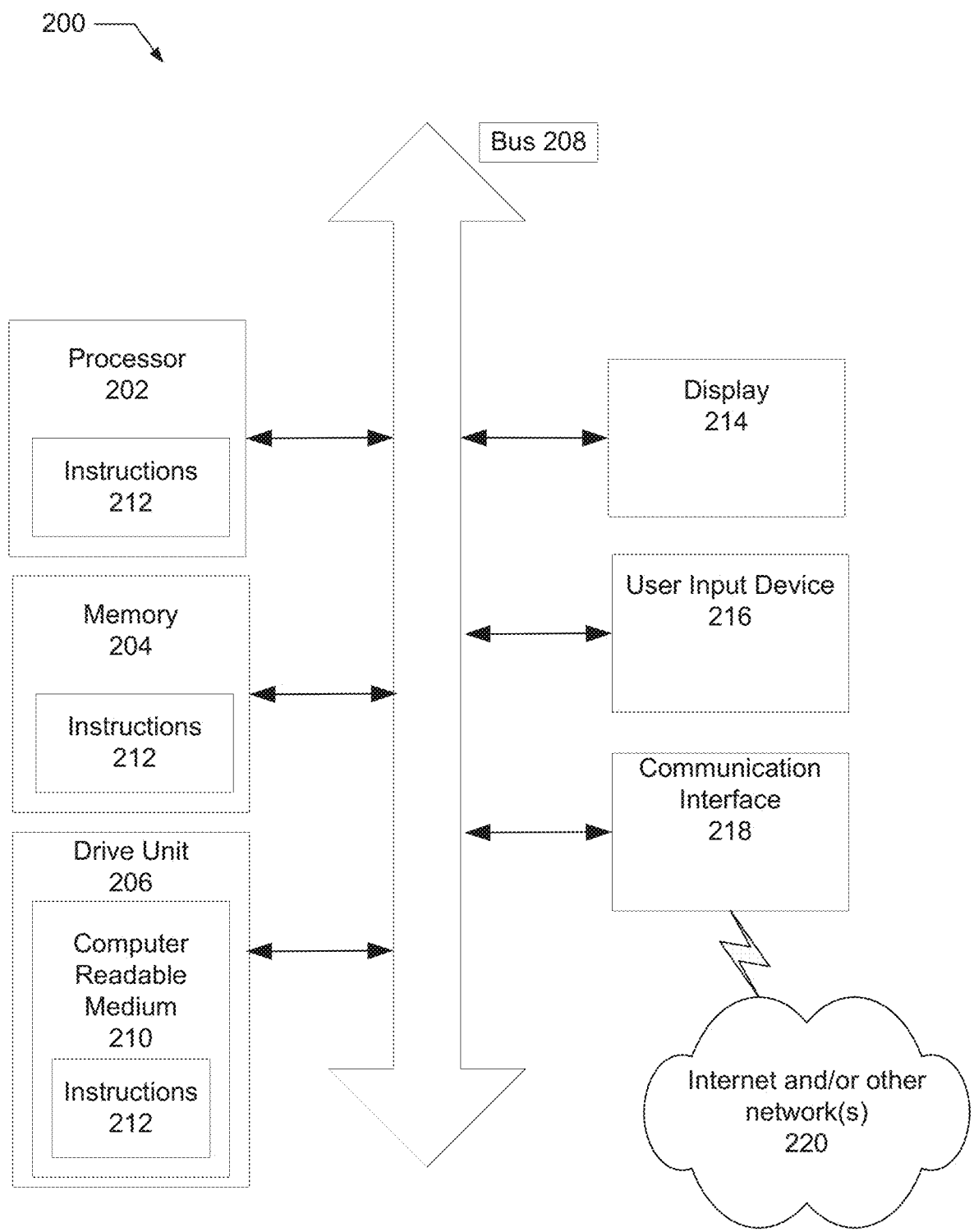
FIG. 2 depicts an illustrative embodiment of a general computer system for use with the disclosed embodiments.
Figure 5A:
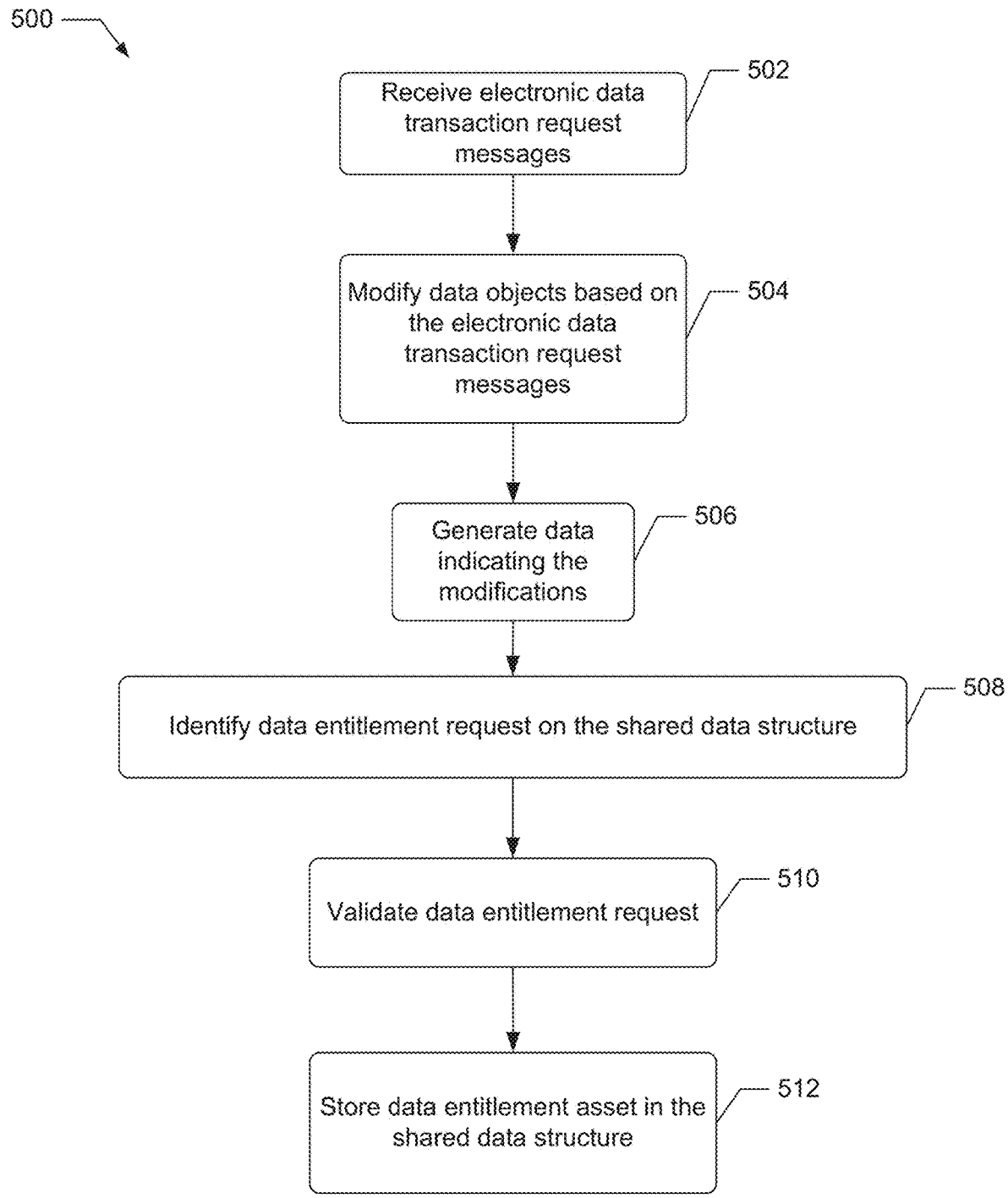
FIG. 5A depicts an example flowchart for implementing a data entitlement system in accordance with the disclosed embodiments.

FIG. 5A illustrates an example flowchart 500 indicating an example method of implementing a data entitlement system, as may be implemented with computer devices and computer networks, such as those described with respect to FIGS. 1 and 2. Embodiments may involve all, more or fewer actions indicated by the blocks of FIG. 5A. The actions may be performed in the order or sequence shown or in a different sequence. In one embodiment, the steps of FIG. 5A may be carried out by exchange computing system 100.

The process begins an exchange computing system receives electronic data transaction request messages, as shown in block 502. For example, the electronic data transaction request messages may be messages to trade or match values for financial instruments traded on the exchange computing system. The process then includes modifying, by the processor, data objects stored in a memory based on the electronic data transaction request messages, as shown in block 504. The process next includes generating data indicating the modifications, as shown in block 506. The data indicating the modifications may be included in one or more streams of data messages provided to users via one or more market data feeds.

Next, a requesting entity may submit a payment to the exchange computing system, which generates market data, for the market data, as shown in block 508. In particular, the exchange computing system identifies a data entitlement request comprising a request for access to the data indicating the modifications to the at least one data object as described herein, which includes the transfer of currency or credit, or other transfer of payment/compensation to the exchange computing system, and a request for entitlement to the desired data, i.e., a data entitlement request. In other words, the requesting entity may pre-pay the exchange computing system for the market data. The requesting entity may pay the exchange computing system by transferring currency, or value, via the distributed electronic ledger. In one embodiment, the requesting entity may add or store the data entitlement request to the shared data structure, which allows the exchange computing system to access and identify and/or read the data entitlement request.

The data entitlement request may specify a given software vendor. As discussed herein, the software vendor's software package may be necessary to view or interact with the data. For example, the requesting entity may be requesting data that will fit into, or be delivered to an end user, via a specified software package. If the data entitlement request specifies a software vendor, the validation of the data entitlement request by the exchange computing system, and the subsequently generated data entitlement asset, will only be valid for that particular specified software vendor.

In one embodiment, the data entitlement request may include a list of one or more software vendors, or an indicator that the request is for entitlement to receive data from all software vendors. The data entitlement request may additionally include a list of one or more trading firms, or an indication that this request is for entitlement to receive data through all trading firms. The data entitlement request may additionally include a list of restrictions or permissions for the market data that are requested, e.g. for user display only, an algorithmic trading engine, a risk or profit and loss calculation system, and whether a user can export the data to external applications. Again, the exchange computing system may use some or all of the information contained in the data entitlement request to validate the request.

For example, the data entitlement request may include a trading firm name, which may use the market data to place trades, and a requested data feed. The exchange computing system may charge different trading firms different fees for different data feeds. Accordingly, the exchange computing system may validate whether a submitted currency or value transfer (i.e., paid feeds) is valid for the requested feed for the particular trading firm.

The exchange computing system, or owner/generator of the requested data, may validate the data entitlement request, as shown in block 510. In one embodiment, the exchange computing system may confirm ownership and transfer of the digital asset to the exchange or another designated party and identify and/or read the data entitlement request. The data entitlement request may include, among other information, an identity of the user to be entitled to receive market data; the market data feeds or exchanges requested (e.g. CME, CBOT, NYMEX, COMEX); and the period of time for which market data is requested (e.g. June 2016).

The exchange computing system may, for example, validate that the payment via the distributed electronic ledger is correct for the requested data, or that the user is properly registered, for example, to receive the requested data. For example, a given data feed may cost a given amount for a particular type of user. The exchange computing system may validate whether a request added to the shared data structure by that user satisfies the cost of that data feed.

Upon validating that the requesting entity has paid the correct amount for the data requested, the exchange computing system may issue a data entitlement asset onto the distributed electronic ledger, as shown in block 512, the data entitlement asset being operative to enable access, as described herein, by the participant computing system to the requested data indicating the modifications to the at least one data object. The data entitlement asset may be cryptographically signed by the exchange computing system to authenticate that the exchange computing system has indeed validated the data entitlement request.

In one embodiment, which may be used if the distributed electronic ledger does not support "smart contracts", the exchange computing system monitors the distributed electronic ledger and in response to a received payment, captures the request data, validates that the request is valid (e.g. that the payment submitted is sufficient for the market data license requested), and, if valid, issues a digital asset on the distributed electronic ledger that is a data entitlement. This entitlement may include some or all of the information submitted on the request.

In another embodiment of the invention, the distributed electronic ledger supports "smart contracts", which embody programmatic rules that automatically validate the request (e.g. the payment submitted is sufficient for the market data license requested), and if valid, automatically issue the digital asset for the data entitlement. Thus, in one embodiment, a distributed electronic ledger supporting "smart contracts" eliminates the need for the exchange computing system to act on each and every data entitlement request.

The exchange computing system and/or its smart contract could respond to entitlement requests from trusted sources that do not include payment, and issue the digital assets corresponding to the data entitlements on the distributed electronic ledger. In this embodiment, these entitlements would be effective immediately in entitling users to receive market data but funds would need to be remitted to the exchange computing system at a later date.

The data entitlement asset, although generated by the exchange computing system, may be accessible to various software providers. When a trader or other user operates the software provided by the software vendor, the user must prove its identity to the software vendor. In one embodiment, a user's identity on the distributed electronic ledger could be used to authenticate the user to the software vendor, possibly via a challenge and response mechanism and/or proving possession of a private key corresponding with a public key related to the user's identity.

The data entitlement asset may be an XML, or JSON file including data fields specifying details about the entitled data, such as, for example, the software vendor that can use the data. The data entitlement asset may include start and stop dates that define the time period over which the requester is requesting data access.

In one embodiment, the data entitlement asset may be a super set of the data entitlement request. Thus, the data entitlement asset may include all of the information included in the data entitlement request, but add additional data useful for the software vendor to determine whether a data requestor, e.g., a data consumer/influencer should receive the requested data.

Figure 5B:
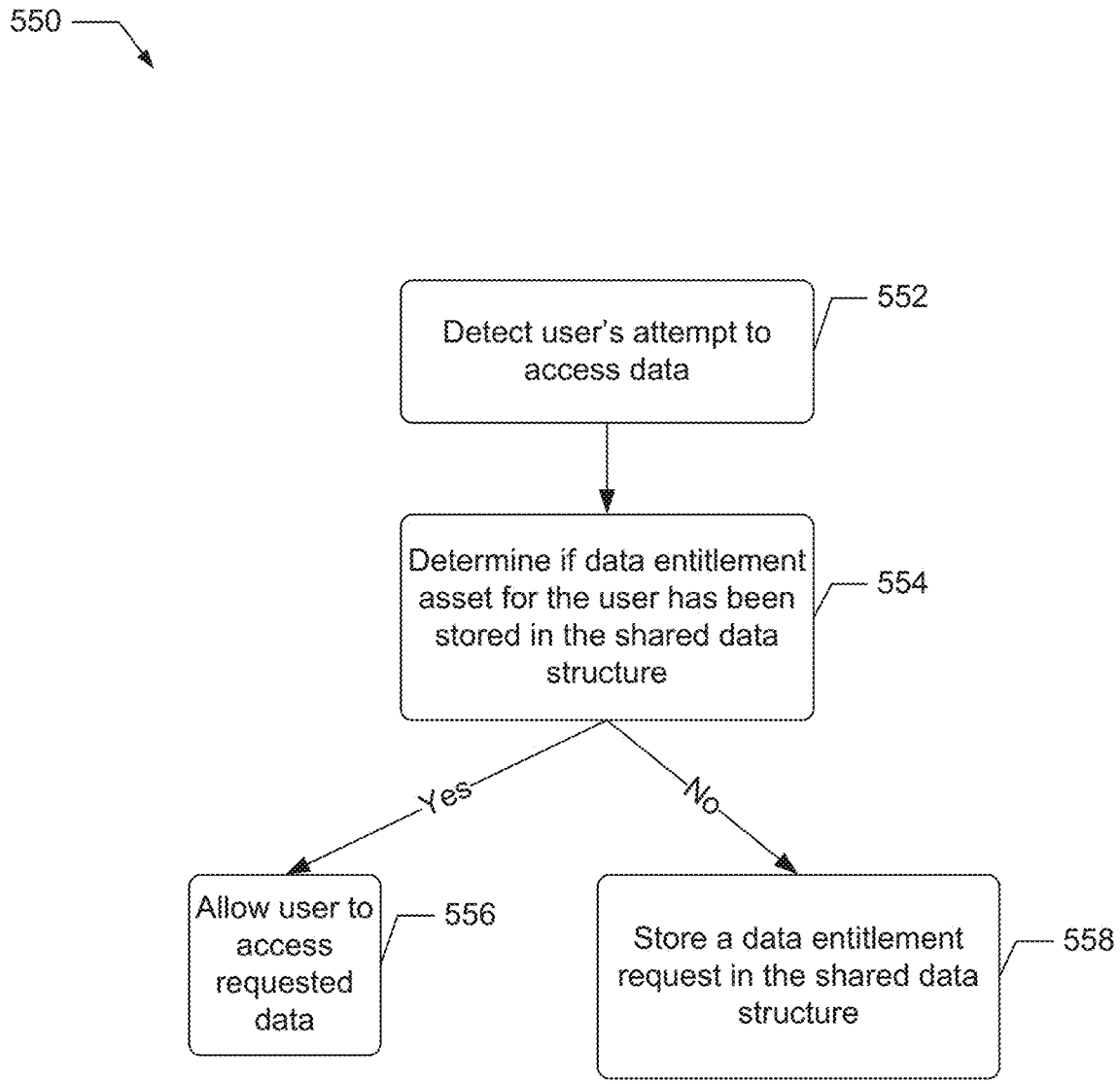
FIG. 5B depicts another example flowchart for implementing a data entitlement system in accordance with the disclosed embodiments.

FIG. 5B illustrates an example flowchart 550 indicating an example method of implementing a data entitlement system, as may be implemented with computer devices and computer networks, such as those described with respect to FIGS. 1 and 2. Embodiments may involve all, more or fewer actions indicated by the blocks of FIG. 5B. The actions may be performed in the order or sequence shown or in a different sequence.

The process begins when a software vendor, having access to the shared data structure, detects when a user implementing a software package associated with the software vendor attempts to access data, as shown in block 552. The software vendor associated with the software package may then query the distributed electronic ledger as to whether the distributed electronic ledger contains a data entitlement asset for that particular trader, as shown in block 554.

The vendor may only allow data to flow to the trader if the distributed electronic ledger contains a data entitlement asset for that particular trader, as shown in block 556. In one embodiment, if the data entitlement asset limits the data usage to one or more software vendors, then the vendor will confirm that its own identity is included in that list before allowing data to flow to the trader. If the data entitlement asset limits use of the data to one or more trading firms, then the vendor will confirm that the trader is associated with the trading firm, or one of the trading firms specified in that list before allowing data to flow to the trader. If the data entitlement asset includes one or more restrictions or permissions for the market data, e.g. for user display only, an algorithmic trading engine, a risk or profit and loss calculation system, and whether a user can export the data to external applications, then the vendor will confirm that the trader's requested usage of the data is compatible with these restrictions or permissions before allowing data to flow to the trader.

Accordingly, the software may be modified so that the software, upon detecting a user's attempt to access data, automatically queries the distributed electronic ledger for the data entitlement asset. The software vendor may acquire or develop its own software to access the distributed electronic ledger and use documentation the exchange computing system provides to interpret the data entitlement digital assets that the exchange computing system issues. Alternatively, in one embodiment, the exchange computing system may provide a software vendor with a software library that accesses the distributed electronic ledger and checks entitlements.

In one embodiment, if a data entitlement asset for the user has not been added to the shared data structure, the software vendor may automatically submit a request for the data the user is attempting to access, and include a payment therefor, as shown in block 558. Thus, the software vendor may act on behalf of the user and become the requesting entity.

In one embodiment, the exchange computing system may not accept the payments in the currencies implemented by the distributed electronic ledger. In such a case, the exchange computing system may support alternate means to receive payments and data entitlement requests, and then issue the digital assets corresponding to the data entitlements on the distributed electronic ledger.

In one embodiment, a user's attempt to access data (e.g., step 552) may actually serve as, or initiate the sending of, a subscription request (e.g., step 508).

The data entitlement asset accordingly acts as a digital "valve" that opens or closes data flow to an end user.

In one embodiment, the data entitlement asset may include a key that is required (by the software vendor's software package configuration) before the data consumer/influencer computer can read the requested and received data. For example, the software may be configured so that it can only allow a data consumer access to the market data if a data entitlement asset exists listing the market data and the data consumer.

In one embodiment, the party requesting the data entitlement request may own a public and private key pair. The data entitlement request may include the public key, or by indicating the target data consumer, may indirectly reference the public key. The data requested may be encrypted, by the data redistributor or the data generator, via the public key associated with the private key owned by the requesting data consumer. Only the private key, which is owned by the target data consumer, may be able to unlock or decrypt the encrypted data. This embodiment may require that the exchange computing system generate and send one copy of the market data for each user.

Alternatively, the data entitlement asset may be used in conjunction with a symmetric key. In particular, in this embodiment, all market data may be encrypted, e.g., by the data generator, with a symmetric secret key. The exchange computing system i.e., the data generator, or alternatively, the data redistributor, may encrypt the shared secret key with each user's public key and place this encrypted data in the entitlement asset. Thus, the market data is only encrypted once with the symmetric secret key, but the symmetric secret key is encrypted separately for each user using that user's public key. The user, having possession of the private key corresponding to the public key, can decrypt the symmetric secret key, which in turn allows the user to decrypt the market data.

In one embodiment, the data entitlement asset is a private key corresponding to the public key. Thus, the only way a data consumer can view the market data is to have a copy of the data entitlement asset, which is only sent to the data consumer if the data redistributor determines that the distributed electronic ledger includes a copy of the data entitlement asset.

To further exercise control over the generated data, the data generator may, in one embodiment, require that the data modifier include the data entitlement asset within the data redistributed to the data consumer. The data generator, e.g., the exchange computing system, could periodically check or audit the information flow between the data redistributor/modifier and the data consumer to check for the presence of the data entitlement asset. Or, the data generator could become a recipient of each data flow sent from the data redistributor to the data consumer, and check each (or some) of the data flow between the data redistributor/modifier and the data consumer to check for the presence of the data entitlement asset. A lack of the data entitlement asset in the data flow could indicate that the data redistributor is not properly complying with the querying requirement.

Figure 6:
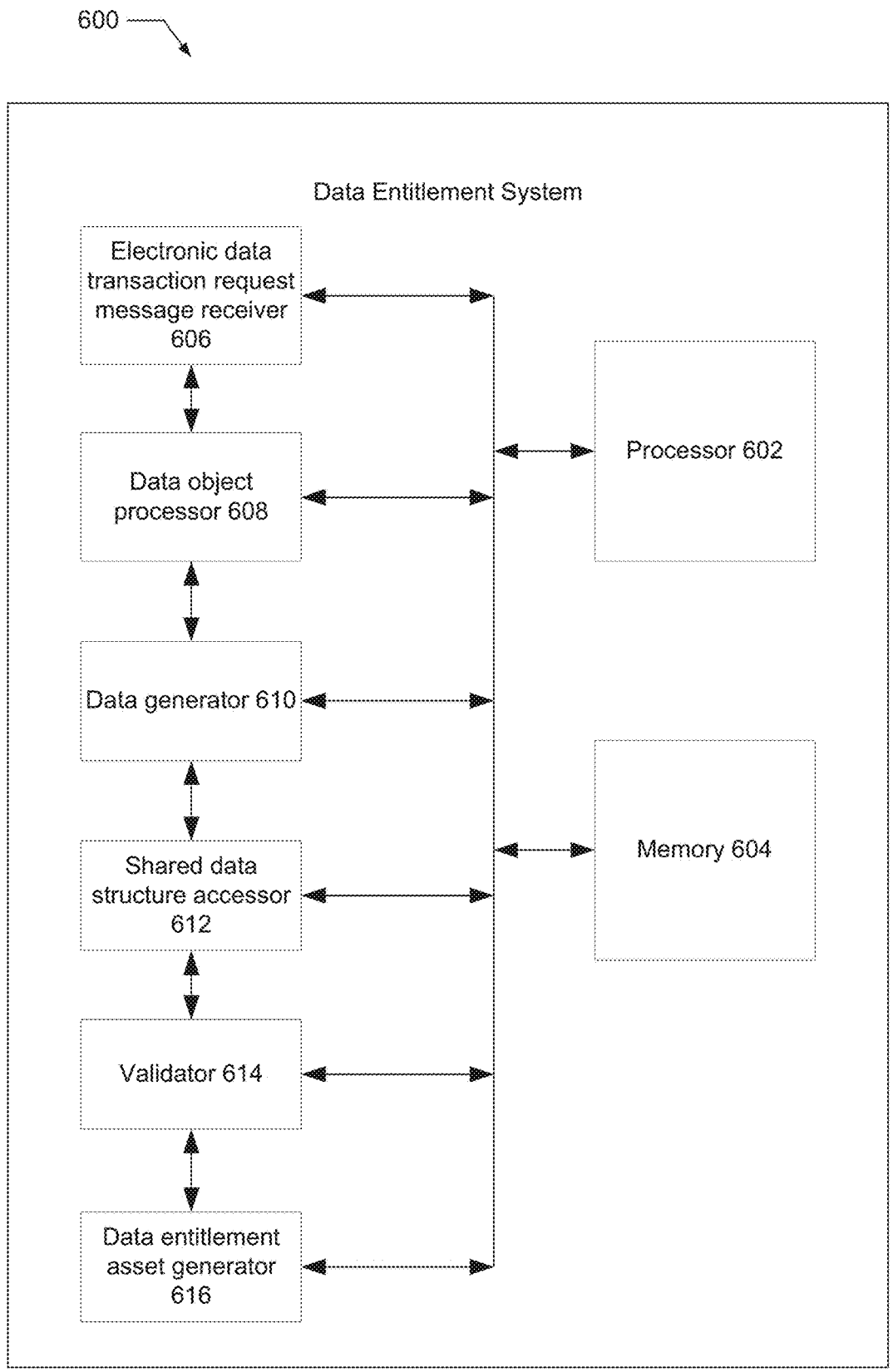
FIG. 6 depicts a block diagram of an exemplary implementation of a data entitlement system in accordance with the disclosed embodiments.

FIG. 6 depicts a block diagram of a data entitlement system 600, which in an exemplary implementation, is implemented as part of the exchange computer system 100 described above.

The system 600 includes a processor 602 and a memory 604 coupled therewith which may be implemented as a processor 202 and memory 204 as described with respect to FIG. 2. The system 600 includes an electronic data transaction request message receiver 606 stored in the memory 604 and executable by the processor 602 to cause the processor 602 to receive and/or analyze electronic data transaction request messages submitted, for example, by users of an exchange computing system implementing the disclosed data entitlement system.

The system 600 further includes a data object processor 608 coupled with the electronic data transaction request message receiver for modifying data objects stored in the memory 604. The system 600 further includes a data generator 610 coupled with the data object processor which generates data indicating the modifications to the data objects, which may be provided to users in data feeds including streams of data messages.

The system 600 also includes a shared data structure accessor 612 for accessing and reading a data entitlement request added to a shared data structure by a participant computing system of the plurality of participant computing systems, the data entitlement request comprising, as described herein, a request for access to the data indicating the modifications to the at least one data object.

The system 600 also includes a validator 614 for determining whether the data entitlement request is valid, as well as a data entitlement asset generator 616 which, upon determining that the data entitlement request is valid, automatically generates a data entitlement asset which is then operative to enable access by the participant computing system to the requested data indicating the modifications to the at least one data object. The shared data structure accessor 612 may add or store the data entitlement asset to the shared data structure.

Referring back to FIG. 1A, the trading network environment shown in FIG. 1A includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1A, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1A also shows the LAN 124 coupled with a wide area network ("WAN") 126 which may be comprised of one or more public or private wired or wireless networks. In one embodiment, the WAN 126 includes the Internet. The LAN 124 may include a router to connect LAN 124 to the WAN 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1A may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1A is merely an example and that the components shown in FIG. 1A may include other components not shown and be connected by numerous alternative topologies.

Referring back to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
generating a data entitlement asset for storage within a distributed electronic ledger shared among a plurality of participant computing systems, the plurality of participant computing systems including at least an exchange computing system, a plurality of software vendor systems, and a plurality of trading firm systems each including one or more trading devices, wherein the exchange computing system generates market data indicating modifications to at least one data object based on at least one of a plurality of electronic data transaction request messages received by the electronic trading system, and transmits the market data to the plurality of software vendor systems for redistribution to one or more trading devices upon validation of a data entitlement asset for a respective trading device by a respective software vendor system, the data entitlement asset stored in the distributed electronic ledger, the generating further comprises:

identifying, by the processor, a data entitlement request stored in the distributed electronic ledger by a trading device of the one or more trading devices, the data entitlement request comprising a request for access to at least a portion of the market data;

validating, by the processor, the data entitlement request;

automatically generating, by the processor, the data entitlement asset; and storing, by the processor, the generated data entitlement asset in the distributed electronic ledger for validation by the software vendor system, the data entitlement asset configured to provide access to the trading device for the requested portion of the market data.

2. The computer implemented method of claim 1 wherein the request for access to the market data comprises a request for access through software operated by a software vendor system for the trading device.

3. The computer implemented method of claim 1, wherein the data entitlement request comprises: (i) an identification of the trading device which stored the data entitlement request in the distributed electronic ledger, (ii) the requested access, and (iii) data indicative of a transfer of payment.

4. The computer implemented method of claim 3, wherein validating the data entitlement request includes determining a required payment based on the identification of the trading device which stored the data entitlement request in the distributed electronic ledger and the market data requested in the data entitlement request, and determining that a payment satisfies the required payment.

5. The computer implemented method of claim 3, wherein the exchange computing system is further operative to encrypt the market data with a public key corresponding to a private key owned by the trading device which stored the data entitlement request in the distributed electronic ledger, the private key useable for decrypting the market data indicating the modifications to the at least one data object.

6. The computer implemented method of claim 3, wherein the exchange computing system is further operative to encrypt the market data with a symmetric shared key and encrypt the symmetric shared key with a public key corresponding to a private key owned by the trading device which stored the data entitlement request in the distributed electronic ledger, the private key useable for decrypting the symmetric shared key and the symmetric shared key useable for decrypting the market data.

7. The computer implemented method of claim 1, wherein each of the plurality of software vendor systems is configured to, upon detecting an attempt by the trading device to access market data redistributed by the software vendor system, query the distributed electronic ledger for a data entitlement asset associated with (i) the trading device that which attempted access and (ii) the requested market data before providing the trading device which attempted access with access to the requested market data.

8. The computer implemented method of claim 1, wherein the data entitlement asset, upon being stored in the distributed electronic ledger by the exchange computing system, is replicated in each of the plurality of participant computing systems.

9. The computer implemented method of claim 1, wherein each of the plurality of software vendor systems are configured to provide one or more of the one or more trading devices with a user interface to access the requested market data.

10. The computer implemented method of claim 1, wherein the plurality of electronic data transaction request messages includes requests to perform transactions related to financial instruments represented by the at least one data object.

11. The computer implemented method of claim 10, wherein the transactions include purchasing or relinquishing a financial instrument.

12. The computer implemented method of claim 1, wherein each of the at least one data object represents an order book for one or more financial instruments transacted by the exchange computing system.

13. A system comprising:

a data entitlement asset generator operative to generate a data entitlement asset for storage within a distributed electronic ledger shared among a plurality of participant computing systems, the plurality of participant computing systems including at least an exchange computing system, a plurality of software vendor systems, and a plurality of trading firm systems each including one or more trading devices, wherein the exchange computing system generates market data indicating modifications to at least one data object based on at least one of a plurality of electronic data transaction request messages received by the electronic trading system, and transmits the market data to the plurality of software vendor systems for redistribution to one or more trading devices upon validation of a data entitlement asset for a respective trading device by a respective software vendor system, the data entitlement asset stored in the distributed electronic ledger, the data entitlement asset generator including a computer processor coupled with a memory, the computer processor specifically configured to:

identify a data entitlement request stored in the distributed electronic ledger by a trading device of the one or more trading devices, the data entitlement request comprising a request for access to at least a subset of the market data;

determine whether the data entitlement request is valid; and upon determining that the data entitlement request is valid, automatically generate a data entitlement asset and store the generated data entitlement asset in the distributed electronic ledger for validation by the software vendor system, the data entitlement asset being operative to enable access by the trading device to the requested subset of market data.

14. The system of claim 13, wherein the request for access to at least the subset of the market data comprises a request for access through software operated by a software vendor system for the trading device.

15. The system of claim 13, wherein the data entitlement request comprises: (i) an identification of the trading device which stored the data entitlement request in the distributed electronic ledger, (ii) the requested access to the data indicating the modifications to the at least one data object, and (iii) data indicative of a transfer of payment.

16. The system of claim 15, wherein the computer processor is further specifically configured to determine whether the data entitlement request is valid by determining a required payment based on the identification of the trading device which stored the data entitlement request in the distributed electronic ledger and the data requested in the data entitlement request, and determining whether a payment satisfies the required payment.

17. The system of claim 15, wherein the exchange computing system is further operative to encrypt the data indicating the modifications to the at least one data object with a symmetric shared key and encrypt the symmetric shared key with a public key corresponding to a private key owned by the trading device which stored the data entitlement request in the distributed electronic ledger, the private key useable for decrypting the symmetric shared key and the symmetric shared key useable for decrypting the data indicating the modifications to the at least one data object.

18. The system of claim 13, wherein each of the plurality of software vendor systems is configured to, upon detecting an attempt by a trading device to access data indicating the modifications to the at least one data object redistributed by the software vendor system, query the distributed electronic ledger for a data entitlement asset associated with (i) the trading device which attempted access and (ii) the requested data indicating the modifications to the at least one data object, wherein each of the plurality of software vendor systems are further configured to provide the trading device which attempted access with access to the requested data indicating the modifications to the at least one data object.

19. The system of claim 13, wherein the computer processor is further specifically configured to replicate the data entitlement asset, upon being stored in the distributed electronic ledger by the exchange computing system, in each of the other plurality of participant computing systems.

20. A computer system which generates a data entitlement asset for storage within a distributed electronic ledger shared among a plurality of participant computing systems, the plurality of participant computing systems including at least an exchange computing system, a plurality of software vendor systems, and a plurality of trading firm systems each including one or more trading devices, wherein the exchange computing system generates market data indicating modifications to at least one data object based on at least one of a plurality of electronic data transaction request messages received by the electronic trading system, and transmits the market data to the plurality of software vendor systems for redistribution to one or more trading devices upon validation of a data entitlement asset for a respective trading device by a respective software vendor system, the data entitlement asset stored in the distributed electronic ledger, the computing system comprising:

a module configured to identify a data entitlement request stored in the distributed electronic ledger by a trading device, the data entitlement request comprising a request for access to at least a portion of the market data, the module further configured to determine whether the data entitlement request is valid and upon determining that the data entitlement request is valid, automatically generate a data entitlement asset enabling access by the trading device through a software vendor system of the plurality of software vendor systems to at least the portion of the requested market data, wherein the market data module stores the data entitlement asset in the distributed electronic ledger.

* * * * *